(12) United States Patent
Uchino et al.

(10) Patent No.: US 12,341,727 B2
(45) Date of Patent: Jun. 24, 2025

(54) FLEXIBLE CHANNEL STRUCTURE FOR PAIRED RADIO FREQUENCY SPECTRUM BANDS

(71) Applicant: QUALCOMM Incorporated, San Diego, CA (US)

(72) Inventors: Toru Uchino, Zushi (JP); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/881,562

(22) Filed: Aug. 4, 2022

(65) Prior Publication Data

US 2024/0048341 A1 Feb. 8, 2024

(51) Int. Cl.
*H04L 5/00* (2006.01)
*H04L 5/14* (2006.01)
*H04W 72/1263* (2023.01)

(52) U.S. Cl.
CPC .......... *H04L 5/0092* (2013.01); *H04L 5/0078* (2013.01); *H04L 5/1469* (2013.01); *H04W 72/1263* (2013.01)

(58) Field of Classification Search
None
See application file for complete search history.

(56) References Cited

U.S. PATENT DOCUMENTS 10,123,339 B1 * 11/2018 Bertz .................... H04L 5/0098
11,324,022 B1 * 5/2022 Rai .................... H04W 72/0453
2013/0163543 A1 * 6/2013 Freda .................... H04L 5/0092
  370/329
2014/0119264 A1 * 5/2014 Shauh .................... H04W 72/30
  370/312
2014/0161002 A1 * 6/2014 Gauvreau ............. H04L 5/0032
  370/280

(Continued)

FOREIGN PATENT DOCUMENTS

WO    WO-2021215739 A1    10/2021

OTHER PUBLICATIONS

International Search Report and Written Opinion—PCT/US2023/071217—ISA/EPO—Nov. 8, 2023 (2204068WO).

(Continued)

*Primary Examiner* — Eunsook Choi
(74) *Attorney, Agent, or Firm* — Holland & Hart LLP

(57) ABSTRACT

Methods, systems, and devices for wireless communications are described. A user equipment (UE) may receive control signaling that includes an indication of a configuration for wireless communications with a wireless device using a first operating band of a radio frequency spectrum band. The first operating band may include a first carrier that is paired with a second carrier of the first operating band. The first carrier may be separated in frequency from the second carrier and used for one of transmissions from the UE or receptions at the UE, while the second carrier may be used for both transmissions from the UE and receptions at the UE. The UE may use the second carrier for both transmissions and receptions using time division duplexing (TDD) according to the configuration. The UE may concurrently communicate messages with the wireless device using the first carrier and the second carrier.

30 Claims, 20 Drawing Sheets

(56) References Cited

U.S. PATENT DOCUMENTS

| | | | | |
|---|---|---|---|---|
| 2016/0249357 A1* | 8/2016 | Green | ................ | H04W 72/0453 |
| 2016/0381589 A1* | 12/2016 | Zhang | .................... | H04L 5/0053 |
| | | | | 370/252 |
| 2020/0281022 A1* | 9/2020 | Pelletier | ............ | H04W 72/0453 |
| 2022/0141851 A1* | 5/2022 | Gross | ................ | H04W 28/0231 |
| | | | | 370/329 |
| 2023/0156459 A1 | 5/2023 | Jin et al. | | |

OTHER PUBLICATIONS

Moderator (NTT Docomo, Inc): "Summary on NR UE Features for Others" 3GPP TSG RAN WG1 #104-e, R1-2101595, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 25, 2021, XP051975861, 44 Pages, Section 2.2.

* cited by examiner

Transmit control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration ⟵ 1805

Transmit second control signaling that includes a second indication for the wireless device to switch from one of transmitting from the wireless device or receiving at the wireless device using the first carrier for a first set of time intervals to a different one of transmitting from the wireless device or receiving at the wireless device using the second carrier for a second set of time intervals ⟵ 1810

Communicate concurrently a plurality of messages with the wireless device using the first carrier and the second carrier ⟵ 1815

FLEXIBLE CHANNEL STRUCTURE FOR PAIRED RADIO FREQUENCY SPECTRUM BANDS

FIELD OF TECHNOLOGY

The following relates to wireless communications, including flexible channel structure for paired radio frequency spectrum bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities, each supporting wireless communication for communication devices, which may be known as user equipment (UE). In some communication systems, the network entities and UEs may support wireless communications using paired radio frequency spectrum bands or unpaired radio frequency spectrum bands.

SUMMARY

The described techniques relate to improved methods, systems, devices, and apparatuses that support flexible channel structure for paired radio frequency spectrum bands. For example, the described techniques provide for time division duplexing (TDD) and frequency division duplexing (FDD) using a paired radio frequency spectrum band. In some examples, a user equipment (UE) may receive control signaling that includes an indication of a configuration for wireless communications with a wireless device using a first operating band of a radio frequency spectrum band. The first operating band may include a first carrier that is paired with a second carrier of the first operating band. The first carrier may be separated in frequency from the second carrier and used for one of transmissions from the UE or receptions at the UE, while the second carrier may be used for both transmissions from the UE and receptions at the UE. The UE may use the second carrier for both transmissions and receptions using TDD according to the configuration. The UE may concurrently communicate messages with the wireless device using the first carrier and the second carrier.

A method for wireless communication at a UE is described. The method may include receiving control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the UE or receptions at the UE, and where the second carrier is used for both transmissions from the UE and receptions at the UE using TDD according to the configuration and communicating concurrently a set of multiple messages with the wireless device using the first carrier and the second carrier.

An apparatus for wireless communication at a UE is described. The apparatus may include a processor, a memory coupled with the processor, wherein the memory comprises instructions executable by the processor to cause the apparatus to receive control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the UE or receptions at the UE, and where the second carrier is used for both transmissions from the UE and receptions at the UE using TDD according to the configuration and communicate concurrently a set of multiple messages with the wireless device using the first carrier and the second carrier.

Another apparatus for wireless communication at a UE is described. The apparatus may include means for receiving control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the UE or receptions at the UE, and where the second carrier is used for both transmissions from the UE and receptions at the UE using TDD according to the configuration and means for communicating concurrently a set of multiple messages with the wireless device using the first carrier and the second carrier.

A non-transitory computer-readable medium storing code for wireless communication at a UE is described. The code may include instructions executable by a processor to receive control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the UE or receptions at the UE, and where the second carrier is used for both transmissions from the UE and receptions at the UE using TDD according to the configuration and communicate concurrently a set of multiple messages with the wireless device using the first carrier and the second carrier.

In some examples of the method, apparatuses, and non-transitory computer-readable medium described herein, receiving the control signaling that includes the indication may include operations, features, means, or instructions for receiving a first indication of the first carrier paired with the second carrier in the first operating band and a second indication of the second carrier identifying that the second carrier may be unpaired, where the second carrier may be used for both transmissions from the UE and receptions at the UE based on the first indication and the second indication.

In some examples of the method, apparatuses, and non-transitory computer-readable medium described herein, receiving the control signaling may include operations, features, means, or instructions for receiving a second indication that the first carrier may be used for FDD or for supplemental downlink at the UE and the second carrier may be used for TDD at the UE, where the first carrier may be used for transmissions from the UE or receptions at the UE and the second carrier may be used for transmissions from the UE and receptions at the UE based on the second indication.

Some examples of the method, apparatuses, and non-transitory computer-readable medium described herein may further include operations, features, means, or instructions for receiving second control signaling that includes a second indication for the UE to switch from one of transmitting from the UE or receiving at the UE using the first carrier for a first set of time intervals to a different one of transmitting from the UE or receiving at the UE using the second carrier for a second set of time intervals.

In some examples of the method, apparatuses, and non-transitory computer-readable medium described herein, the second indication includes an indication for the UE to switch from using a first BWP corresponding to the one of transmitting from the UE or receiving at the UE using the first carrier to using a second BWP corresponding to the different one of transmitting from the UE or receiving at the UE using the second carrier.

Some examples of the method, apparatuses, and non-transitory computer-readable medium described herein may further include operations, features, means, or instructions for receiving second control signaling that identifies a mapping between a channel and two or more of downlink, uplink, or sidelink, where the channel includes a quality of service (QoS) flow, a radio bearer, a radio link control (RLC) channel or bearer, logical channel, where communicating the set of multiple messages may be based on the mapping.

Some examples of the method, apparatuses, and non-transitory computer-readable medium described herein may further include operations, features, means, or instructions for receiving second control signaling that includes a second indication scheduling a first message to be communicated using a first one or more resources from a resource pool and a second message to be communicated using a second one or more resources from the resource pool, where the first one or more resources may be associated with the first carrier and the second one or more resources may be associated with the second carrier, and where communicating the set of multiple messages may be based on the second indication.

Some examples of the method, apparatuses, and non-transitory computer-readable medium described herein may further include operations, features, means, or instructions for receiving first scheduling information for a first message of the set of multiple messages to be communicated using the first carrier and second scheduling information for a second message of the set of multiple messages to be communicated using the second carrier, the first carrier and the second carrier being separately scheduled.

Some examples of the method, apparatuses, and non-transitory computer-readable medium described herein may further include operations, features, means, or instructions for receiving second control signaling that includes a second indication of a first quantity of hybrid automatic repeat request (HARQ) processes associated with the first carrier and a second quantity of HARQ processes associated with the second carrier.

In some examples of the method, apparatuses, and non-transitory computer-readable medium described herein, the first carrier and the second carrier may be used at least for transmissions from the UE and the method, apparatuses, and non-transitory computer-readable medium may include further operations, features, means, or instructions for receiving second control signaling that includes a second indication for the UE to use the first carrier, the second carrier, or both, for transmitting feedback associated with communicating the set of multiple messages.

Some examples of the method, apparatuses, and non-transitory computer-readable medium described herein may further include operations, features, means, or instructions for receiving second control signaling that includes a second indication identifying at least one type of signal to be transmitted from the UE or received at the UE using the first carrier during a random access procedure and at least one respective type of signal to be transmitted from the UE and received at the UE using the second carrier during the random access procedure.

In some examples of the method, apparatuses, and non-transitory computer-readable medium described herein, the second control signaling further includes a third indication of a first timing advance value to be used at the UE for the first carrier and a second timing advance value to be used at the UE for the second carrier.

Some examples of the method, apparatuses, and non-transitory computer-readable medium described herein may further include operations, features, means, or instructions for receiving second control signaling that includes a second indication for the UE to use the first carrier, the second carrier, or both, for performing received power measurements for channel state information (CSI) reporting.

Some examples of the method, apparatuses, and non-transitory computer-readable medium described herein may further include operations, features, means, or instructions for transmitting second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

A method for wireless communication at a network entity is described. The method may include transmitting control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the wireless device or receptions at the wireless device, and where the second carrier is used for both transmissions from the wireless device and receptions at the wireless device using TDD according to the configuration and communicating concurrently a set of multiple messages with the wireless device using the first carrier and the second carrier.

An apparatus for wireless communication at a network entity is described. The apparatus may include a processor, wherein the memory comprises instructions executable by the processor to cause the apparatus to transmit control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the wireless device or receptions at the wireless device, and where the second carrier is used for both transmissions from the wireless device and receptions at the wireless device using TDD according to the configuration and communicate concurrently a set of multiple messages with the wireless device using the first carrier and the second carrier.

Another apparatus for wireless communication at a network entity is described. The apparatus may include means for transmitting control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the wireless device or receptions at the wireless device, and where the second carrier is used for both transmissions from the wireless device and receptions at the wireless device using TDD according to the configuration and means for communicating concurrently a set of multiple messages with the wireless device using the first carrier and the second carrier.

A non-transitory computer-readable medium storing code for wireless communication at a network entity is described. The code may include instructions executable by a processor to transmit control signaling that includes an indication of a configuration for wireless communications with a wireless device using a first operating band of a radio frequency spectrum band, the first operating band including a first carrier that is paired with a second carrier of the first operating band, where the first carrier is separated in frequency from the second carrier, the first carrier is used for one of transmissions from the wireless device or receptions at the wireless device, and where the second carrier is used for both transmissions from the wireless device and receptions at the wireless device using TDD according to the configuration and communicate concurrently a set of multiple messages with the wireless device using the first carrier and the second carrier.

In some examples of the method, apparatuses, and non-transitory computer-readable medium described herein, transmitting the control signaling may include operations, features, means, or instructions for transmitting a first indication of the first carrier paired with the second carrier in the first operating band and a second indication of the second carrier identifying that the second carrier may be unpaired, where the second carrier may be used for both transmissions from the wireless device and receptions at the wireless device based on the first indication and the second indication.

In some examples of the method, apparatuses, and non-transitory computer-readable medium described herein, transmitting the control signaling may include operations, features, means, or instructions for transmitting a second indication that the first carrier may be used for FDD or for supplemental downlink at the wireless device and the second carrier may be used for TDD at the wireless device, where the first carrier may be used for transmissions from the wireless device or receptions at the wireless device and the second carrier may be used for transmissions from the wireless device and receptions at the wireless device based on the second indication.

Some examples of the method, apparatuses, and non-transitory computer-readable medium described herein may further include operations, features, means, or instructions for transmitting second control signaling that includes a second indication for the wireless device to switch from one of transmitting from the wireless device or receiving at the wireless device using the first carrier for a first set of time intervals to a different one of transmitting from the wireless device or receiving at the wireless device using the second carrier for a second set of time intervals.

Some examples of the method, apparatuses, and non-transitory computer-readable medium described herein may further include operations, features, means, or instructions for transmitting second control signaling that includes a second indication identifying at least one respective transport channel for the first carrier and the second carrier, where communicating the set of multiple messages may be based on the second indication.

In some examples of the method, apparatuses, and non-transitory computer-readable medium described herein, the second indication includes an indication for the wireless device to switch from using a first BWP corresponding to the one of transmitting from the wireless device or receiving at the wireless device using the first carrier to using a second BWP corresponding to a different one of transmitting from the wireless device or receiving at the wireless device using the second carrier.

Some examples of the method, apparatuses, and non-transitory computer-readable medium described herein may further include operations, features, means, or instructions for transmitting second control signaling that identifies a mapping between a channel and two or more of downlink, uplink, or sidelink, where the channel includes a QoS flow, a radio bearer, a RLC channel or bearer, logical channel, where communicating the set of multiple messages may be based on the mapping.

Some examples of the method, apparatuses, and non-transitory computer-readable medium described herein may further include operations, features, means, or instructions for transmitting second control signaling that includes a second indication scheduling a first message to be communicated using a first one or more resources from a resource pool and a second message to be communicated using a second one or more resources from the resource pool, where the first one or more resources may be associated with the first carrier and the second one or more resources may be associated with the second carrier, and where communicating the set of multiple messages may be based on the second indication.

Some examples of the method, apparatuses, and non-transitory computer-readable medium described herein may further include operations, features, means, or instructions for transmitting first scheduling information for a first message of the set of multiple messages to be communicated using the first carrier and second scheduling information for a second message of the set of multiple messages to be communicated using the second carrier, the first carrier and the second carrier being separately scheduled.

Some examples of the method, apparatuses, and non-transitory computer-readable medium described herein may further include operations, features, means, or instructions for transmitting second control signaling that includes a second indication of a first quantity of HARQ processes associated with the first carrier and a second quantity of HARQ processes associated with the second carrier.

In some examples of the method, apparatuses, and non-transitory computer-readable medium described herein, the first carrier and the second carrier may be used at least for transmissions from the wireless device and the method, apparatuses, and non-transitory computer-readable medium may include further operations, features, means, or instructions for transmitting second control signaling that includes a second indication for the wireless device to use the first carrier, the second carrier, or both, for transmitting feedback associated with communicating the set of multiple messages.

In some examples of the method, apparatuses, and non-transitory computer-readable medium described herein, the second control signaling further includes a third indication of a first timing advance value to be used at the wireless device for the first carrier and a second timing advance value to be used at the wireless device for the second carrier.

Some examples of the method, apparatuses, and non-transitory computer-readable medium described herein may further include operations, features, means, or instructions for transmitting second control signaling that includes a second indication for the wireless device to use the first carrier, the second carrier, or both, for performing received power measurements for CSI reporting.

In some examples of the method, apparatuses, and non-transitory computer-readable medium described herein, the wireless device includes a UE and the method, apparatuses, and non-transitory computer-readable medium may include further operations, features, means, or instructions for receiving second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

BRIEF DESCRIPTION OF THE DRAWINGS

FIGS. 15 through 18 show flowcharts illustrating methods that support flexible channel structure for paired radio frequency spectrum bands in accordance with one or more aspects of the present disclosure.

DETAILED DESCRIPTION

Figure 1:
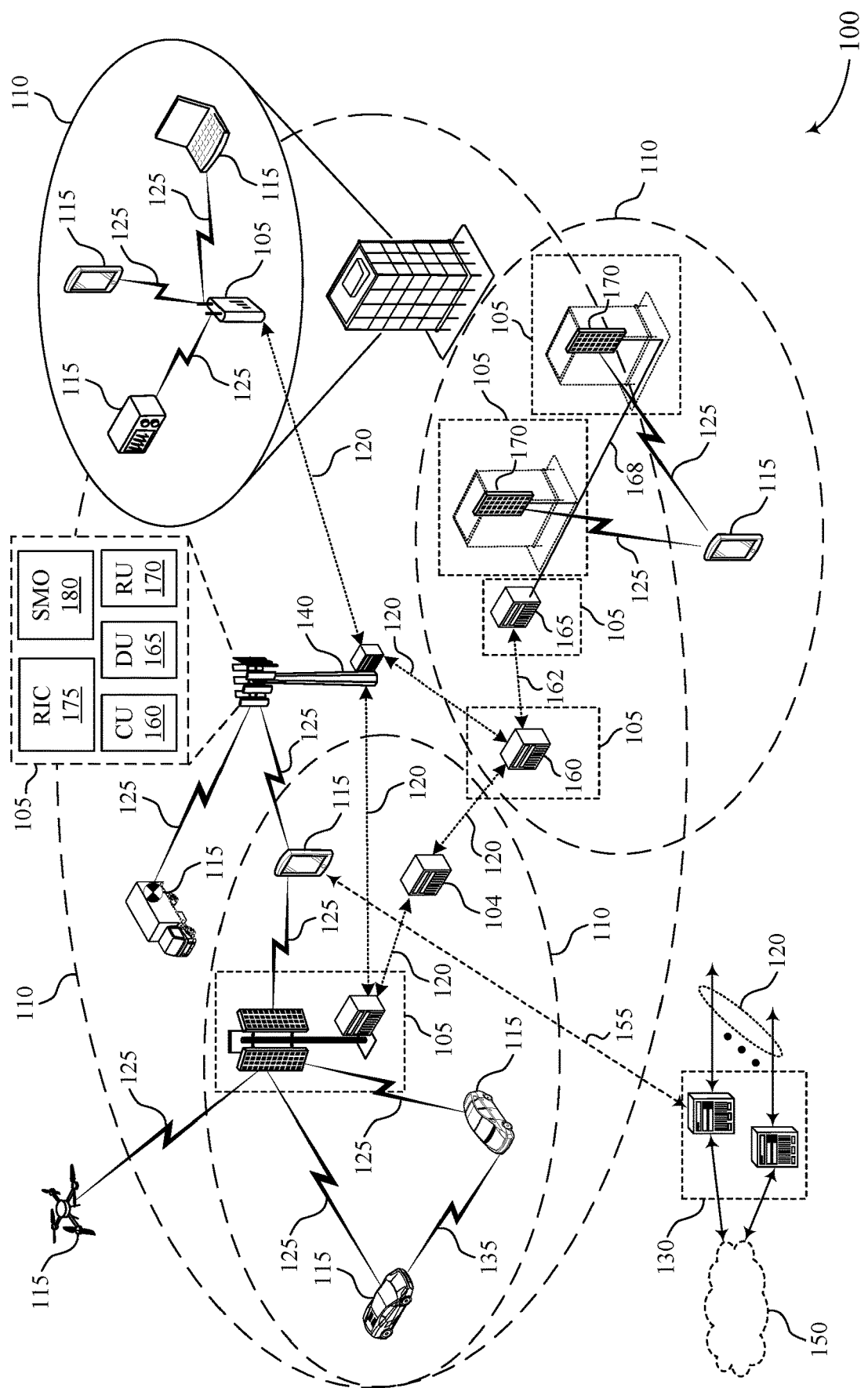
FIGS. 1 and 2 each illustrate an example of a wireless communications system that supports flexible channel structure for paired radio frequency spectrum bands in accordance with one or more aspects of the present disclosure.

In some wireless communications systems, a communication device (e.g., a user equipment (UE), a network entity) may support wireless communications using paired operating bands of a radio frequency spectrum bands (e.g., a frequency range 1 (FR1) radio frequency spectrum band or, a frequency range 2 (FR2) radio frequency spectrum band) or unpaired operating bands. As described herein, paired operating bands may refer to an operating band that includes a first set of frequencies (e.g., a first continuous range of frequencies that may be referred to as a band, an operating band, or a carrier, and may include a range or set of subcarriers) configured for receptions at the communication device and a second set of frequencies (e.g., another continuous range of frequencies that may also be referred to as a band, an operating band, or a carrier, and may include a range or set of subcarriers) that is paired with the first set of frequencies and configured for transmissions at the communication device. In some examples of paired operating bands, the first set of frequencies (e.g., a first band, a first operating band, a first carrier) and the second set of frequencies (e.g., a second band, a second operating band, a second carrier) may be non-overlapping in frequency (e.g., separated in frequency, or have a frequency range or set of subcarriers between and separating the two sets of frequencies in frequency). Additionally, or alternatively, as described herein, an unpaired operating band may refer to a set of frequencies (e.g., a range of frequencies that may be referred to as a band, an operating band, or a carrier) that may be used for both transmissions and receptions at the communication device.

For example, the communication device may be capable of concurrent uplink and downlink communications using paired operating bands via frequency division duplexing (FDD) or using an unpaired operating band via time division duplexing (TDD). Performing uplink and downlink communications concurrently using two paired operating bands (e.g., via FDD) may provide for reduced latencies and increased predictability of latency (e.g., experienced at the communication device). In some examples, however, time-frequency resource allocation for uplink and downlink communications via FDD may be rigid (e.g., fixed, inflexible), which may lead to inefficient utilization of time-frequency resources within a wireless communications system. Inefficient utilization of time-frequency resources may lead to degraded performance, for example if a density of communication devices operating within the wireless communications system is relatively high. Performing uplink and downlink communications concurrently using TDD may provide increased flexibility for the allocation of time-frequency resources (e.g., of the unpaired operating band), which may lead to increased resource utilization within the wireless communications system.

Various aspects of the present disclosure generally relate to techniques for flexible channel structure for paired radio frequency spectrum bands, and more specifically, to techniques for using TDD and FDD with a paired operating band. For example, techniques described herein may enable TDD operations with paired operating bands (e.g., operating bands which may be configured for FDD operations) to provide flexible resource allocation, while maintaining reduced latencies. In some examples, a communication device (e.g., the UE) may be configured to use paired operating bands (e.g., a pair of carriers) that includes a first carrier and a second carrier that is separated in frequency from the first carrier. The UE may perform FDD using the first carrier and the second carrier and TDD using the second carrier. That is, the first carrier may be used for transmissions from the UE or receptions at the UE and the second carrier may be used for transmissions from the UE and receptions at the UE.

In some examples, the network may configure the UE to perform FDD using the first carrier and the second carrier and TDD using the second carrier. For example, the network may indicate, to the UE, one or more rules (e.g., and one or more parameters) for switching between transmission and receptions using the second carrier (e.g., switching between a bandwidth part (BWP) of the carrier that may be configured for transmissions at the UE and another BWP of the carrier that may be configure for receptions at the UE). Additionally, or alternatively, the network may indicate, to the UE, a mapping of the first carrier and the second carrier to multiple (e.g., different) transport channels, multiple communication directions (e.g., downlink, uplink, and sidelink), or both. In some examples, the network may schedule transmissions or receptions (or both) at the UE using the first carrier and the second carrier. For example, the network may indicate, to the UE, to transmit feedback using the first carrier or the second carrier (or both). Additionally, or alternatively, the network may configure the UE to perform random access procedures and channel state information (CSI) measurements using the first carrier or the second carrier (or both).

Particular aspects of the subject matter described herein may be implemented to realize one or more of the following potential advantages. The techniques employed by the described communication devices may provide benefits and enhancements to the operation of the communication devices, including enabling a UE to perform FDD using a first carrier of a paired operating band and a second carrier of the paired operating band and TDD using the second carrier. For example, operations performed by the described communication devices may provide flexible resource allocation and reduced latencies. In some implementations, operations performed by the described communication devices may also support increased resource utilization, increased throughput, and higher data rates, among other possible benefits.

Aspects of the disclosure are initially described in the context of wireless communications systems. Aspects of the disclosure are also described in the context of a carrier configuration diagram, resource allocation diagrams, and carrier scheduling diagrams. Aspects of the disclosure are further illustrated by and described with reference to apparatus diagrams, system diagrams, and flowcharts that relate to flexible channel structure for paired radio frequency spectrum bands.

FIG. 1 illustrates an example of a wireless communications system 100 that supports flexible channel structure for paired radio frequency spectrum bands in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support flexible channel structure for paired radio frequency spectrum bands as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of operating band resources having a defined physical layer structure for supporting the communication links 125. For example, a carrier used for a communication link 125 may include a portion of an operating band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the operating band and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an operating band resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed operating bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed operating bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support TDD and FDD using a paired operating band. For example, a UE 115 may receive control signaling (e.g., from a network entity 105) that includes an indication of a configuration for wireless communications with a wireless device (e.g., another UE 115, the network entity 105) using a first operating band (e.g., a paired operating band) of a radio frequency spectrum band (e.g., FR1, FR2). The first operating band may include a first carrier that is paired with a second carrier. The first carrier may be separated in frequency from the second carrier and used for one of transmissions from the UE 115 or receptions at the UE 115, while the second carrier may be used for both transmissions from the UE 115 and receptions at the UE 115. The UE 115 may use the second carrier for both transmissions and receptions using TDD according to the configuration. In some examples, the UE 115 may concurrently communicate messages with the wireless device using the first carrier and the second carrier. For example, the UE 115 may concurrently transmit the multiple messages to the wireless device using the first carrier and the second carrier, concurrently receive the multiple messages from the wireless device using the first carrier and the second carrier, or concurrently transmit one or more messages to the wireless device and receive one or more messages from the wireless device using the first carrier and the second carrier.

Figure 2:
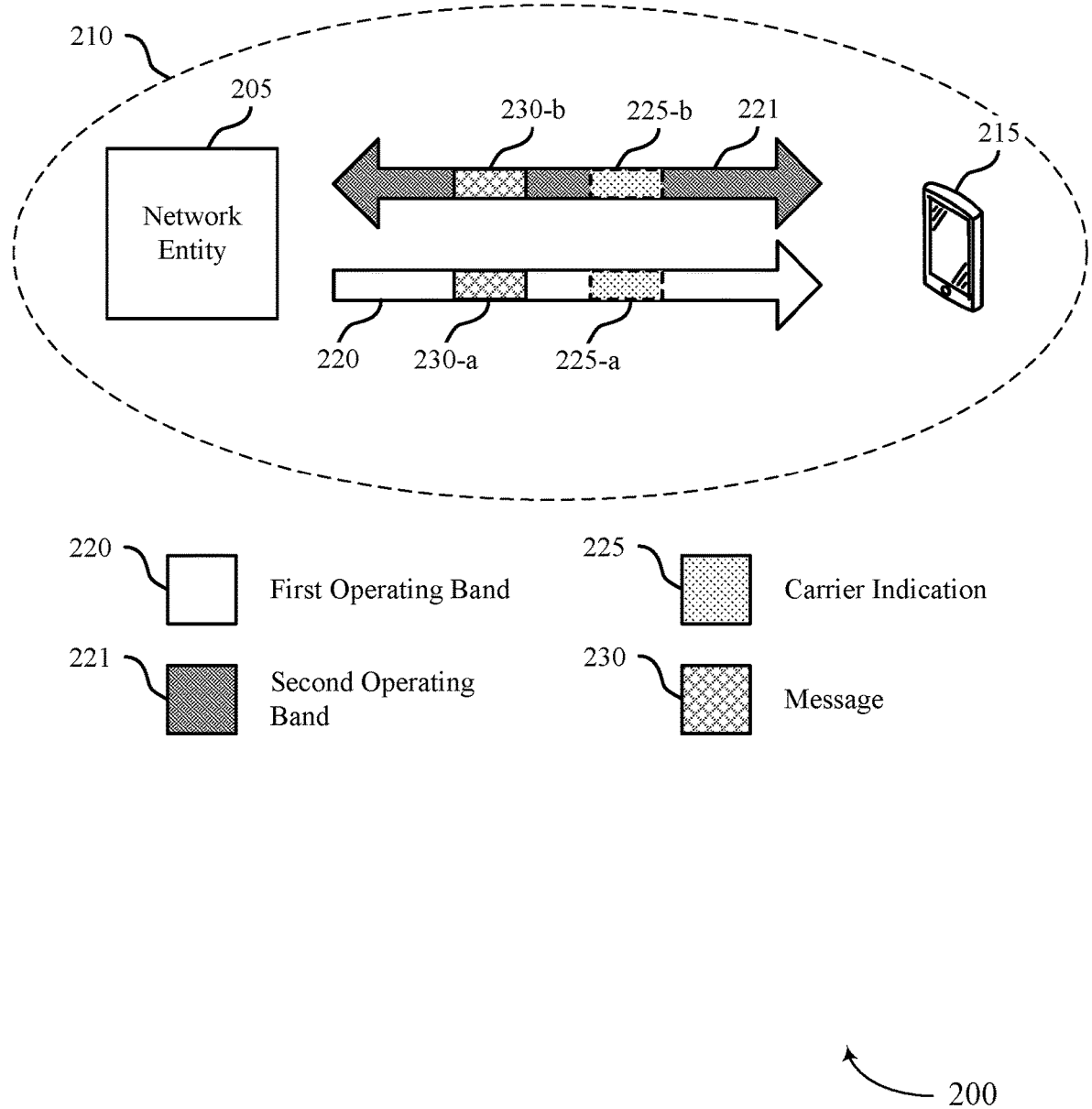

FIG. 2 illustrates an example of a wireless communications system 200 that supports flexible channel structure for paired radio frequency spectrum bands in accordance with one or more aspects of the present disclosure. In some examples, the wireless communications system 200 may implement aspects of the wireless communications system 100. For example, the wireless communications system 200 may include a UE 215 and a network entity 205, which may be examples of the corresponding devices as described with reference to FIG. 1. The network entity 205 may operate within a coverage area 210. The coverage area 210 may be an example of a coverage area 110 as described with reference to FIG. 1.

In some examples, the wireless communications system 200 may be an example of a New Radio (NR) system that supports communications using both paired operating bands and unpaired operating bands. As described herein, a paired operating band may refer to an operating band that includes a first set of frequencies (e.g., a range of frequencies that may be referred to as an operating band or a carrier) configured for receptions at the UE 215 and a second set of frequencies (e.g., another range of frequencies that may also be referred to as an operating band or a carrier) that is paired with the first set of frequencies and configured for transmissions at the UE 215. In some examples of paired operating bands, the first set of frequencies (e.g., a first operating band, a first carrier) and the second set of frequencies (e.g., a second operating band, a second carrier) may be non-overlapping (e.g., separated) in frequency. Additionally, or alternatively, as described herein, an unpaired operating band may refer to a set of frequencies (e.g., a range of frequencies that may be referred to as an operating band or a carrier) that may be used for both transmissions and receptions at the UE 215. In some examples, the paired operating bands may be used for FDD at the UE 215, while the unpaired operating band may be used for TDD at the UE 215. The unpaired operating band may provide increased flexibility of a downlink-uplink ratio (e.g., a ratio between a capacity for transmissions from the UE and a capacity for receptions at the UE) relative to the paired operating bands. For example, using the unpaired operating band, the network entity 205 may flexibly allocate resources of the unpaired operating band for downlink and uplink communications (e.g., may flexibility allocate an increased capacity to either downlink receptions or uplink transmissions at the UE 215) based on traffic conditions (e.g., current traffic conditions). In some examples, reduced flexibility of the paired operating bands (e.g., relatively less flexibility relative to the unpaired operating band) may lead to underutilization of frequency resources within the wireless communications system 200 based on the traffic conditions (e.g., based on a current traffic situation, such as if downlink traffic is heavier than uplink traffic).

In some examples, a flexible channel structure for paired radio frequency spectrum bands (e.g., paired operating bands), as described herein, may provide one or more enhancements to resource utilization within the wireless communications system 200. For example, the network entity 205 may configure the UE 215 with paired operating bands (e.g., a first operating band 220 and a second operating band 221) that the UE 215 may use for receptions (e.g., to receive communications) or transmissions (e.g., to transmit communications), or both. In such an example, the UE 215 may either receive or transmit communications using the first operating band 220 (e.g., one carrier) and may switch (e.g., in a time domain) between receptions and transmissions using the second operating band 221 (e.g., another carrier). That is, the flexible channel structure for paired operating bands, as described herein, may enable TDD (e.g., one or more TDD concepts) for paired operating bands (e.g., the first operating band 220 and the second operating band 221).

As illustrated in the example of FIG. 2, the network entity 205 may configure the UE 215 to receive communications from the network entity using the first operating band 220 and to switch between transmitting communications to the network entity 205 and receiving communications from the network entity 205 using a second operating band 221. For example, the UE 215 may receive control signaling (e.g., from a network entity 205) that includes a carrier indication 225 (e.g., a carrier indication 225-a, a carrier indication 225-b) of a configuration for wireless communications with a wireless device (e.g., another UE 215, the network entity 205) using paired operating bands (e.g., including the first operating band 220 and the second operating band 221) of a radio frequency spectrum band (e.g., FR1, FR2). The paired operating bands may include the first operating band 220 (e.g., a first carrier) that is paired with the second operating band 221 (e.g., a second carrier). The first operating band 220 may be separated in frequency from the second operating band 221 and used for one of transmissions from the UE 215 or receptions at the UE 215, while the second operating band 221 may be used for both transmissions from the UE 215 and receptions at the UE 215. The UE 215 may use the second operating band 221 for both transmissions and receptions using TDD according to the configuration. In some examples, the UE 215 may concurrently communicate messages with the wireless device using the first operating band 220 and the second operating band 221. For example, the UE 215 may concurrently receive a message 230-a from, and transmit a message 230-b to, the network entity 205 using the first operating band 220 and the second operating band 221, respectively.

Although the example of FIG. 2 illustrates the first operating band 220 (e.g., the first carrier) as being used for receptions at the UE 215, it is to be understood that the first operating band 220 may be used for transmissions or receptions at the UE 215 and the examples described herein should not be considered limiting to the scope covered by the claims or the disclosure. Additionally, or alternatively, although the example of FIG. 2 illustrates the second operating band 221 (e.g., the second carrier) being used for both transmissions and receptions at the UE 215, it is to be understood that the UE 215 may switch transmission and reception on either the first operating band 220 or the second operating band 221 and the examples described herein should not be considered limiting to the scope covered by the claims or the disclosure. For example, switching between transmissions and receptions (e.g., in the time domain) may occur on both the first operating band 220 or the second operating band 221. Additionally, or alternatively, as described herein, receptions at the UE 215 may include downlink receptions or sidelink receptions (or both) and transmissions at the UE 215 may include uplink transmissions or sidelink receptions (or both). In some examples, configuring the UE 215 to receive communications from the network entity 205 using the first operating band 220 and to switch between transmitting communications to the network entity 205 and receiving communications from the network entity 205 using a second operating band 221 may provide for increased resource utilization within the wireless communications system 200, among other possible benefits.

Figure 3:
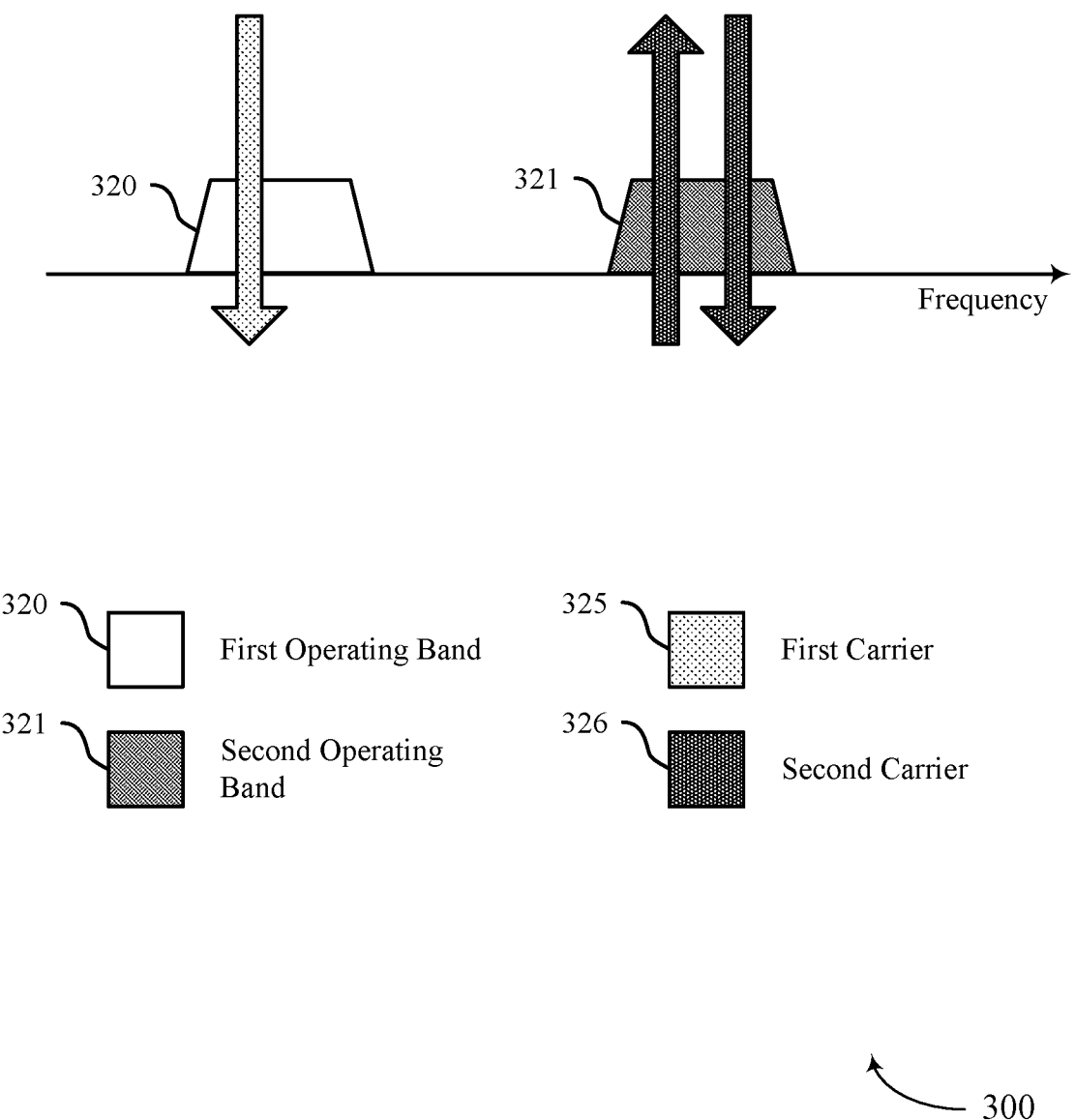
FIG. 3 illustrates an example of a carrier configuration diagram that supports flexible channel structure for paired radio frequency spectrum bands in accordance with one or more aspects of the present disclosure.

FIG. 3 illustrates an example of a carrier configuration diagram 300 that supports flexible channel structure for paired radio frequency spectrum bands in accordance with one or more aspects of the present disclosure. In some examples, the carrier configuration diagram 300 may implement aspects of the wireless communications system 100 and the wireless communications system 200. For example, the carrier configuration diagram 300 may be implemented at a UE and a network entity, which may be examples of the corresponding devices as described with reference to FIGS. 1 and 2.

In some examples, the network (e.g., the network entity) may configure the UE to identify an operating band (e.g., a carrier, a set of frequency resources) of two paired operating bands (e.g., a paired spectrum) to use for transmissions or receptions at the UE and another operating band (e.g., another carrier, another set of frequencies) to use for transmissions and receptions at the UE. For example, the network entity may configure the UE to perform operations that may include both (e.g., a combination of) TDD and FDD operations. Additionally, or alternatively, the network entity may provide (e.g., transmit) multiple band indications (e.g., operating band indications) to the UE (e.g., as part of the configuration).

In some examples, the network entity may transmit, to the UE, an indication of paired carriers (e.g., a paired carrier indication, a paired operating band indication) and an indication of an unpaired carrier (e.g., an unpaired carrier indication, an unpaired operating band indication). As illustrated in the example of FIG. 3, the UE may receive a paired carrier indication identifying paired operating bands (e.g., a serving cell, such as n1) that includes a first operating band 320 to be used for receptions at the UE (e.g., downlink receptions, sidelink receptions) and a second operating band 321 to be used for transmissions at the UE (e.g., uplink transmissions or sidelink transmissions). The first operating band 320 may include a first carrier 325 (e.g., a set of frequencies, such as 2110 MHz-2170 MHz) and the second operating band 321 may include a second carrier 326 (e.g., another set of frequencies, such as 1920 MHz-1980 MHz). Additionally, or alternatively, the UE may receive an unpaired carrier indication identifying an unpaired operating band (e.g., another serving cell, such as n2). For example, the unpaired carrier indication may identify the unpaired operating band as the second operating band 321, which may include the second carrier 326 (e.g., the set of frequencies that range from 1920 MHz-1980 MHz). In some examples, based on receiving the paired carrier indication and the unpaired carrier indication, the UE may determine that the second carrier 326 (e.g., the relatively lower range of frequency of the serving cell n1) may be used for both transmissions and receptions at the UE. Although the example of FIG. 3 illustrates the first operating band 320 as being used for receptions at the UE, it is to be understood that the first operating band 320 may be used for transmissions or receptions at the UE and the examples described herein should not be considered limiting to the scope covered by the claims or the disclosure.

In some examples, the UE may receive multiple unpaired carrier indications. For example, the UE may receive a first unpaired carrier indication identifying the first carrier 325 as a supplemental carrier (e.g., a supplemental downlink carrier (SDL) or a supplemental uplink carrier (SUL)) and a second unpaired carrier indication identifying the second carrier 326 as a normal TDD carrier. In some examples, based on receiving the first unpaired carrier indication and the second unpaired carrier indication, the UE may determine that the first operating band 320 may be used for transmissions or receptions at the UE and second carrier 326 may be used for both transmissions and receptions at the UE. In some examples, the UE may receive one or more other combinations of unpaired carrier indications that indicate the first operating band 320 may be used for transmissions or receptions at the UE and second carrier 326 may be used for both transmissions and receptions at the UE.

For example, the UE may receive a first unpaired carrier indication identifying the first carrier 325 as a normal TDD carrier and a second unpaired carrier indication identifying the second carrier 326 as normal TDD carrier. Additionally, or alternatively, the UE may receive multiple (e.g., three or four) unpaired carrier indications that identify the first carrier 325 and the second carrier 326 as one or more supplemental carriers. For example, the UE may receive a first unpaired carrier indication identifying the first carrier 325 as an SDL, a second unpaired carrier indication identifying the second carrier 326 as an SDL, and a third unpaired carrier indication identifying the second carrier 326 as an SUL. Additionally, or alternatively, the UE may receive a first unpaired carrier indication identifying the first carrier 325 as an SUL, a second unpaired carrier indication identifying the second carrier 326 as an SUL, and a third unpaired carrier indication identifying the second carrier 326 as an SDL. In some examples, the UE may receive a first unpaired carrier indication identifying the first carrier 325 as an SUL, a second unpaired carrier indication identifying the first carrier 325 as another SUL, a third unpaired carrier indication identifying the second carrier 326 as an SDL, and a fourth unpaired carrier indication identifying the second carrier 326 as another SDL.

In some examples, the unpaired carrier indications may identify a carrier (e.g., the first carrier 325 or the second carrier 326) as a normal TDD carrier or a supplemental carrier (e.g., an SUL or an SDL) using an operating band number (or one or more other numbers, indicators, or indices corresponding to the respective operating bands associated with the first carrier 325 and the second carrier 326) assigned to the respective carrier. That is, an unpaired carrier indication may identify, to the UE, that the first carrier 325 is a normal TDD carrier or a supplemental carrier using an identifier (e.g., an operating band number, indicator, or index) associated with the first operating band 320. Additionally, or alternatively, an unpaired carrier indication may identify, to the UE, that the second carrier 326 is a normal TDD carrier or a supplemental carrier using an identifier (e.g., an operating band number, indicator, or index) associated with the second operating band 321. In some examples, association information (e.g., between carriers and the respective operating bands) may be provided (e.g., indicated) to the UE from the network entity (e.g., via broadcast signaling, dedicated signaling) or otherwise configured at the UE.

In some other examples, the UE may receive an indication (e.g., one indication) that identifies a combination (e.g., mix) of TDD and FDD operations at the UE (e.g., for the first carrier 325 and the second carrier 326). For example, the UE may receive an indication that assigns an operating band (e.g., using an operating band number, indicator, or index) for a combination of TDD and FDD operations. That is, the UE may receive an indication that assigns an operating band number, indicator, or index associated with the first operating band 320 for one or both of TDD or FDD operations and another indication that assigns an operating band number, indicator, or index associated with the second operating band 321 for one or both of TDD or FDD operations.

In some examples, the network entity may configure the UE (or the UE may be otherwise configured) with one or more rules for switching between transmission and receptions at the UE (e.g., using the second carrier 326). For example, the UE may perform switching of reception and transmission either semi-statically or dynamically. In some examples of semi-static switching between reception and transmission at the UE, the UE may receive an indication configuring the UE (or the UE may be otherwise configured) with a TDD configuration. For example, the UE may receive an indication of a TDD configuration (e.g., via a tdd-UL-DL-ConfigurationCommon information element (IE) or a tdd-UL-DL-ConfigurationDedicated IE) that may indicate one or more durations (e.g., slots, symbols, time intervals) during which the UE may use the second carrier 326 for transmissions (e.g., uplink transmissions) and one or more other durations (e.g., other slots, other symbols, other time intervals) during which the UE may use the second carrier 326 for receptions. Additionally, or alternatively, in some examples of dynamic switching between receptions and transmissions at the UE, the network entity may indicate, to the UE (e.g., via a medium access control control element (MAC-CE) or downlink control information (DCI)), to use the second carrier 326 for transmissions or receptions.

In some examples, the UE may utilize BWPs to determine whether to use the carrier 326 for transmissions or receptions. That is, the UE may switch between using the second carrier 326 for transmissions and using the second carrier 326 for receptions based on one or more BWPs indicated to the UE for the second carrier 326. For example, the second carrier 326 may be configured (e.g., at the UE) with a first BWP of the second carrier 326 to be used for receptions (e.g., downlink receptions, sidelink receptions) and a second BWP of the second carrier 326 to be used for transmissions (e.g., uplink transmissions, sidelink transmissions). In some examples, the transmission and reception switching (e.g., using the first BWP and the second BWP) may be performed at the UE using one or more BWP switching mechanism. Additionally, or alternatively, a default BWP (e.g., a relatively first active BWP) may be identified (e.g., implicitly determined) at the UE based on a configured behavior of the carrier within the paired operating band. In some examples, the UE may determine a default BWP (e.g., and a communication direction, such as transmission or reception) for the second carrier 326 based on the paired carrier indication. For example, the UE may receive the paired carrier indication identifying that the second carrier 326 (e.g., the relatively lower frequency range carrier of the paired operating bands) is to be used at the UE for transmissions (e.g., uplink transmissions or sidelink transmissions). As such, if the second carrier 326 is configured with the first BWP to be used for receptions and the second BWP to be used for transmissions, the UE may identify (e.g., determine, consider) the second BWP (e.g., the BWP configured at the UE for transmissions, a transmission BWP) as the default BWP for the second carrier 326.

In some examples, a carrier (e.g., the second carrier 326) may be configured with multiple BWPs associated with multiple (e.g., different) TDD configurations. For example, the second carrier 326 may be configured with one or more first BWPs to be used for receptions (e.g., downlink receptions, sidelink receptions) and one or more second BWPs to be used for transmissions (e.g., uplink transmissions, sidelink transmissions). In some examples, one or more default BWPs may be identified (e.g., implicitly determined) at the UE based on the configured behavior of the carrier within the paired operating band. For example, the UE may determine one or more default BWPs (e.g., and a communication direction, such as transmission or reception) for the second carrier 326 based on a configured behavior of the second carrier 326 within the paired operating band. In some examples, the UE may determine the one or more default BWPs (e.g., and a communication direction, such as transmission or reception) for the second carrier 326 based on the paired carrier indication. For example, the UE may receive the paired carrier indication identifying that the second carrier 326 (e.g., the relatively lower frequency range carrier of the paired operating bands) is to be used for transmissions (e.g., uplink transmissions or sidelink transmissions) and, based on the paired carrier indication, may identify (e.g., determine, consider) the one or more second BWP (e.g., all BWPs configured for transmissions) as default BWPs for the second carrier 326. Additionally, or alternatively, the UE may select a transmission-reception ratio based on an associated BWP. For example, the UE may select a transmission-reception ratio from multiple (e.g., different) transmission-reception ratios by switching BWPs (e.g., by switching an active BWP at the UE to a BWP associated with the selected transmission-reception ratio).

In some techniques for transport channel mapping, transport channels and respective structures of the transport channels may be defined for particular types of communication links (e.g., downlink, uplink, and sidelink). For example, some techniques may utilize a mapping (e.g., a fixed relationship) between a transport channel and a direction of signal as well as between a transport channel and a logical channel that may be rigid and inflexible. In some examples, to achieve one or more enhancements to throughput for wireless communications between the UE and the network entity, the UE (and the network entity) may use a flexible mapping (e.g., relationship between transport channels, logical channels, and signal directions) that utilizes multiple (e.g., different) transport channels or logical channels (or both). For example, some techniques for transport channel mapping may consider other structures, such as structures that utilize sidelink (e.g., with downlink and uplink), that may provide a flexible mapping between transport channels and directions of signals as well as between transport channels and logical channels. For example, using such techniques, receptions at the UE may include sidelink receptions and downlink receptions and transmissions at the UE may include sidelink transmissions and uplink transmissions. In some examples, utilizing sidelink (e.g., with downlink and uplink) may provide increased flexibility, which may enable additional types of communication links or additional transport channels (e.g., new possible behaviors) by utilizing sidelink relatively frequently. For example, a sidelink channel (e.g., a physical sidelink shared channel (PSSCH)) may be used at the UE in lieu of one or more (e.g., additional) downlink channels or one or more (e.g., additional) uplink channels. In some examples, the UE may determine whether a particular transport channel may be used for transmissions or receptions based on an indication from the network entity. For example, the UE may receive an indication that identifies (e.g., via a mapping) one or more transport channels that may be used for receptions and one or more transport channels that may be used for transmissions. In some examples, the UE may receive the indication using layer three (L3) signaling (e.g., RRC signaling), layer two (L2) signaling (e.g., via a MAC-CE), or layer one (L1) signaling (e.g., via a DCI).

In some examples, multiple service access points (SAPs) may be used in L2 signaling pathways (e.g., L2 flows) and, as such, the network (e.g., the network entity) may define multiple channel mappings. For example, a quality of service (QoS) flow (e.g., at a SDAP layer of a protocol stack) may be mapped on a downlink bearer, or an uplink bearer, and a sidelink bearer (e.g., at a PDCP layer of the protocol stack). In some examples, a radio bearer (e.g., from the PDCP layer of the protocol stack) may be mapped on a downlink RLC channel (e.g., a downlink RLC bearer) or an uplink RLC channel (e.g., an uplink RLC bearer) and a sidelink RLC channel (e.g., a sidelink RLC bearer) at an RLC layer. Additionally, or alternatively, an RLC channel (e.g., an RLC bearer) may be mapped on a downlink logical channel or an uplink logical channel and a sidelink logical channel (e.g., at the MAC layer of the protocol stack). In some examples, a logical channel may be mapped on a downlink transport channel or an uplink transport channel and a sidelink transport channel (e.g., at a PHY layer, at L1). In some examples, such mappings (e.g., associations between the layers of the protocol stack), may be indicated to the UE using control signaling (e.g., a control message) in a layer (e.g., any of the multiple layers), such as a NAS layer, an RRC layer (e.g., L3), the SDAP layer, the PDCP layer, the RLC layer, the MAC layer, or L1 (e.g., via a DCI).

Figure 4A:
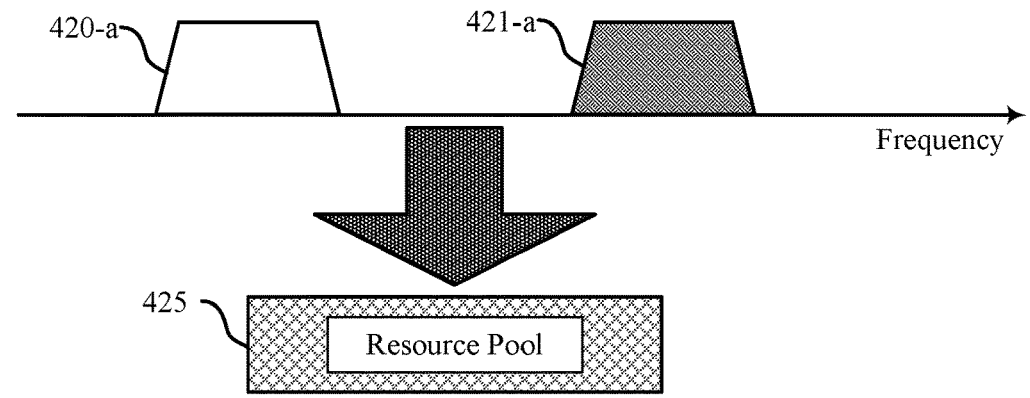
FIGS. 4A and 4B each illustrate an example of a resource allocation diagram that supports flexible channel structure for paired radio frequency spectrum bands in accordance with one or more aspects of the present disclosure.
Figure 4A:
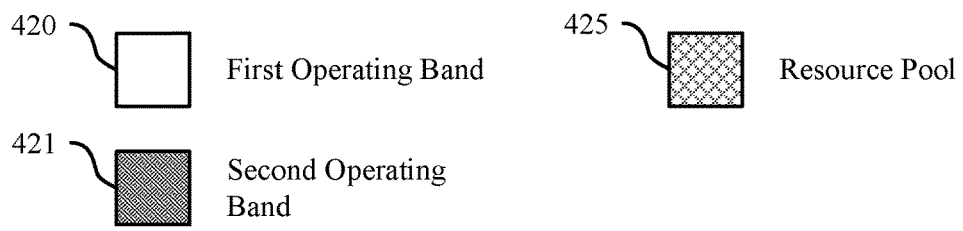
Figure 4B:
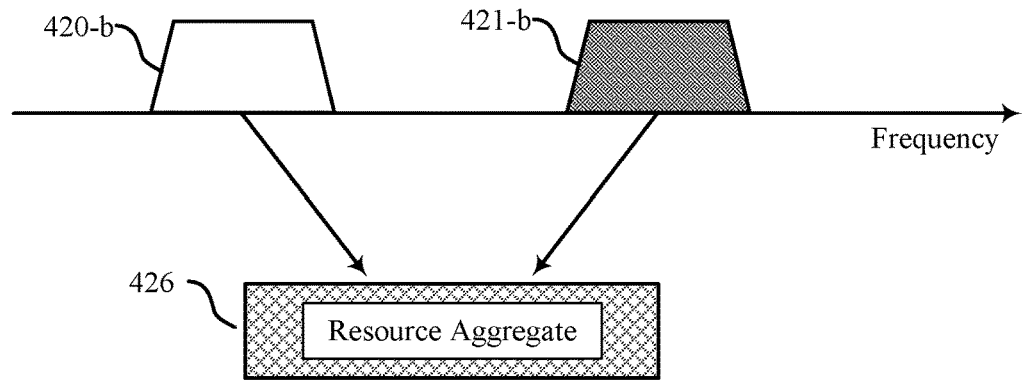
Figure 4B:
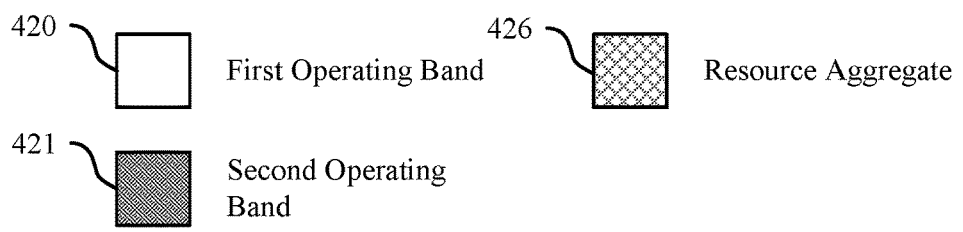

FIGS. 4A and 4B illustrate examples of resource allocation diagrams 400 (e.g., a resource allocation diagram 400-*a* and a resource allocation diagram 400-*b*, respectively) that support flexible channel structure for paired radio frequency spectrum bands in accordance with one or more aspects of the present disclosure. In some examples, the resource allocation diagrams 400 may implement aspects of the wireless communications system 100, the wireless communications system 200, and the carrier configuration diagram 300. For example, the resource allocation diagrams 400 may be implemented at a UE and a network entity, which may be examples of the corresponding devices as described with reference to FIGS. 1 through 3.

In some examples, the network (e.g., via the network entity) may configure the UE to use an operating band (e.g., a first carrier) of two paired operating bands for transmissions or receptions at the UE and another operating band (e.g., the other of the two paired operating bands, an unpaired operating band) to use for transmissions and receptions at the UE. For example, the UE may be configured to use paired operating bands including a first operating band 420 (e.g., a first operating band 420-*a* as described with reference to FIG. 4A or a first operating band 420-*b* as described with reference to FIG. 4B) and a second operating band 421 (e.g., a second operating band 421-*a* as described with reference to FIG. 4A or a second operating band 421-*b* as described with reference to FIG. 4B). In some examples, the UE may be configured to use the first operating bands 420 for either transmissions or receptions at the UE and the second operating bands 421 for both transmissions and receptions at the UE. For example, the UE may perform reception and transmission switching using the second operating bands 421. In some examples of reception and transmission switching (e.g., using the second operating bands 421), the UE may receive or transmit signals (e.g., messages, communications) using one or more carriers of the paired operating band. In such an example, the UE may use one or more (e.g., several) modelling candidates to determine (e.g., select) carriers for communications with the network entity (or one or more other communication devices, one or more other wireless devices).

For example, as illustrated in the example of FIG. 4A, the network may allocate one or more resources to the UE from a resource pool 425 that may include resources of a first carrier of the first operating band 420-*a* and a second carrier of the second operating band 421-*a*. In some examples, the UE may use a modelling candidate in which both carriers (e.g., the first carrier of the first operating band 420-*a* and the second carrier of the second operating band 421-*a*) may be scheduled using common scheduling information. For example (e.g., for such modeling), frequency resources across multiple carriers (e.g., of the first operating band 420-*a* and the second operating band 421-*a*) may be combined (e.g., considered as) a virtual resource pool (e.g., a resource pool virtually, the resource pool 425). That is, the resource pool 425 may be an example of a virtual resource pool that includes one or more frequency resources associated with the first carrier of the first operating band 420-*a* and one or more other resources associated with of the second carrier of the second operating band 421-*a* and may be used to allocated resources to the UE. In such an example, scheduling information (e.g., one scheduling information, such as a single DCI transmitted to the UE from the network entity) may indicate resource allocation, to the UE, from the resource pool 425.

In some other examples, as illustrated in the example of FIG. 4B, each carrier (e.g., the first carrier of the first operating band 420-a and the second carrier of the second operating band 421-a) may be scheduled by respective (e.g., corresponding) scheduling information. For example, the first carrier of the first operating band 420-b may be scheduled by signaling received at the UE using the first carrier (e.g., or one or more other carriers of the first operating band 420-b) and the second carrier of the second operating band 421-b may be scheduled by signaling received at the UE using the second carrier (e.g., or one or more other carriers of the second operating band 421-b). In some examples, the first operating band 420-b and the second operating band 421-b may be included in a same serving cell. In such examples, the UE may aggregate one or multiple BWPs of the first operating band 420-b and the second operating band 421-b (e.g., one or more BWPs of the first operating band 420-b and one or more other BWPs of the second operating band 421-b). That is, the UE may be allocated resources from a resource aggregate 426, which may include one or more BWPs of the first operating band 420-b (e.g., one or more BWPs of the first carrier of the first operating band 420-b) and one or more other BWPs of the second operating band 421-b (e.g., one or more BWPs of the second carrier of the second operating band 421-b). Additionally, or alternatively, the first operating band 420-b and the second operating band 421-b may be included in multiple (e.g., different) serving cells. In such an example, the UE may aggregate one or multiple carriers of the first operating band 420-b and the second operating band 421-b (e.g., such as for carrier aggregation or dual connectivity). That is, the UE may be allocated resources from the resource aggregate 426, which may include one or more carriers of the first operating band 420-b and one or more other carriers of the second operating band 421-b.

FIGS. 5A, 5B, 5C, 5D, and 5E illustrate examples of carrier scheduling diagrams 500 (e.g., a carrier scheduling diagram 500-a, a carrier scheduling diagram 500-b, a carrier scheduling diagram 500-c, a carrier scheduling diagram 500-d, and a carrier scheduling diagram 500-e) that support flexible channel structure for paired radio frequency spectrum bands in accordance with one or more aspects of the present disclosure. In some examples, the carrier scheduling diagrams 500 may implement aspects of the wireless communications system 100, the wireless communications system 200, the carrier configuration diagram 300, and the resource allocation diagram 400. For example, the carrier scheduling diagrams 500 may be implemented at a UE and a network entity, which may be examples of the corresponding devices as described with reference to FIGS. 1 through 3, 4A, and 4B.

In some examples, the network (e.g., the network entity) may configure the UE to use an operating band (e.g., a carrier) of two paired operating bands for transmissions or receptions at the UE and another operating band (e.g., the other of the two paired operating bands, an unpaired operating band) to use for transmissions and receptions at the UE. In some examples, the UE network may use common scheduling information to schedule the UE to communicate using the paired operating bands using common scheduling information. Additionally, or alternatively, the network may schedule the UE to communicate using a first operating band (e.g., of the paired operating bands) via scheduling information corresponding to the first operating band and may schedule the UE to communicate using a second operating band (e.g., of the paired operating bands) via scheduling information corresponding to the second operating band. That is, the network may use common scheduling information (e.g., may transmit scheduling information for both operating bands one of the paired operating bands) or corresponding scheduling information (e.g., may transmit scheduling information for each operating band using the respective operating band) to schedule each operating band of the paired operating bands. In other words, the UE may receive one or multiple scheduling information (e.g., one or multiple messages including scheduling information, such as one or multiple DCI) and one or multiple operating bands (e.g., carriers) may be used to receive the scheduling information. As such, one or multiple (e.g., several) relationship between carrier scheduling (e.g., one or more carriers used at the UE to receive scheduling information) and scheduled carriers (e.g., one or more carriers or BWPs of the carriers allocated to the UE to use for communications) may be considered (e.g., used for allocating resources to the UE).

Figure 5A:
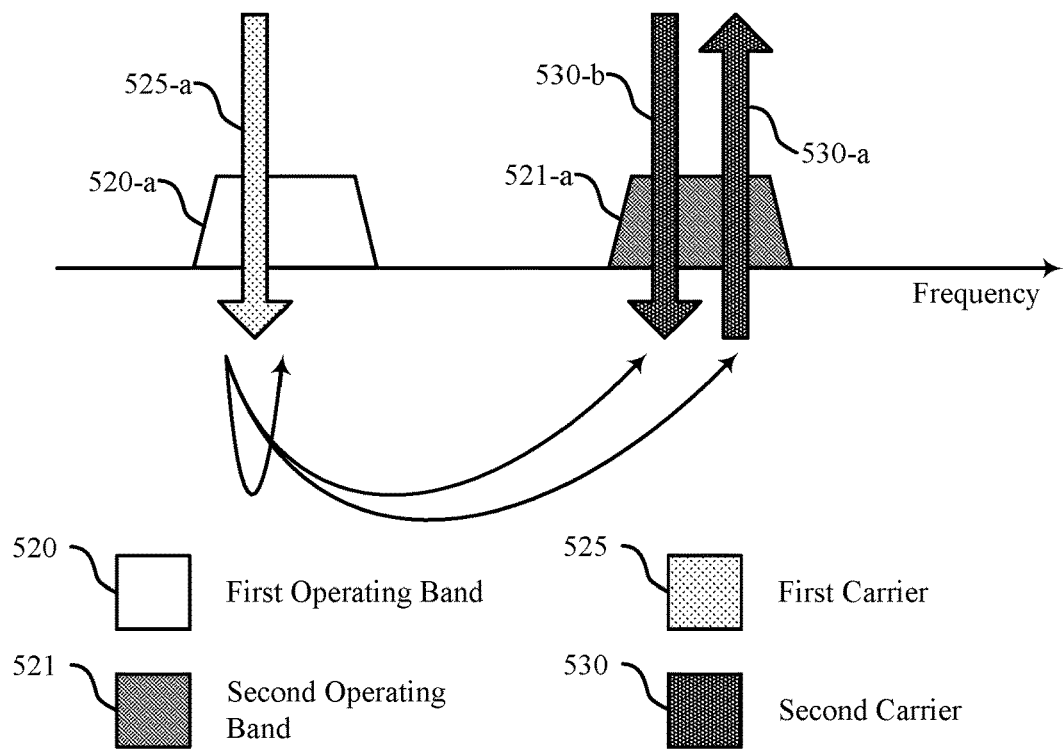
FIGS. 5A, 5B, 5C, 5D, and 5E each illustrate an example of a carrier scheduling diagram that supports flexible channel structure for paired radio frequency spectrum bands in accordance with one or more aspects of the present disclosure.

As illustrated in the example of FIG. 5A, the network may configure the UE (or the UE may be otherwise configured) with paired operating bands including a first operating band 520-a and a second operating band 521-a. In some examples, the first operating band 520-a may be used at the UE for receptions (e.g., using a first carrier 525-a), while the second operating band 521-a may be used at the UE for both transmissions (e.g., using a second carrier 530-a) and receptions (e.g., using a second carrier 530-b). Although the example of FIG. 5A illustrates the first operating band 520-a being used at the UE for receptions, it is to be understood that the first operating band 520-a may also be used at the UE for transmissions and the examples described herein should not be considered limiting to the scope covered by the claims or the disclosure. In the example of FIG. 5A, carriers (or BWPs) configured at the UE may be scheduled from (e.g., using) the first carrier 525-a (e.g., a reception carrier, a carrier of the first operating band 520-a, a carrier of an operating band configured at the UE for transmissions or receptions). For example, the UE may receive signaling (e.g., control signaling, such as one or more DCIs) using the first carrier 525-a that may include scheduling information for the first carrier 525-a (e.g., an indication of resources allocated for receiving communications, such as downlink communications or sidelink communications, at the UE using the first carrier 525-a), the second carrier 530-a (e.g., an indication of resources allocated for transmitting communications, such as uplink communications, at the UE using the second carrier 530-a), and the second carrier 530-b (e.g., an indication of resources allocated for receiving communications, such as downlink communications or sidelink communications, at the UE using the second carrier 530-b).

Figure 5B:
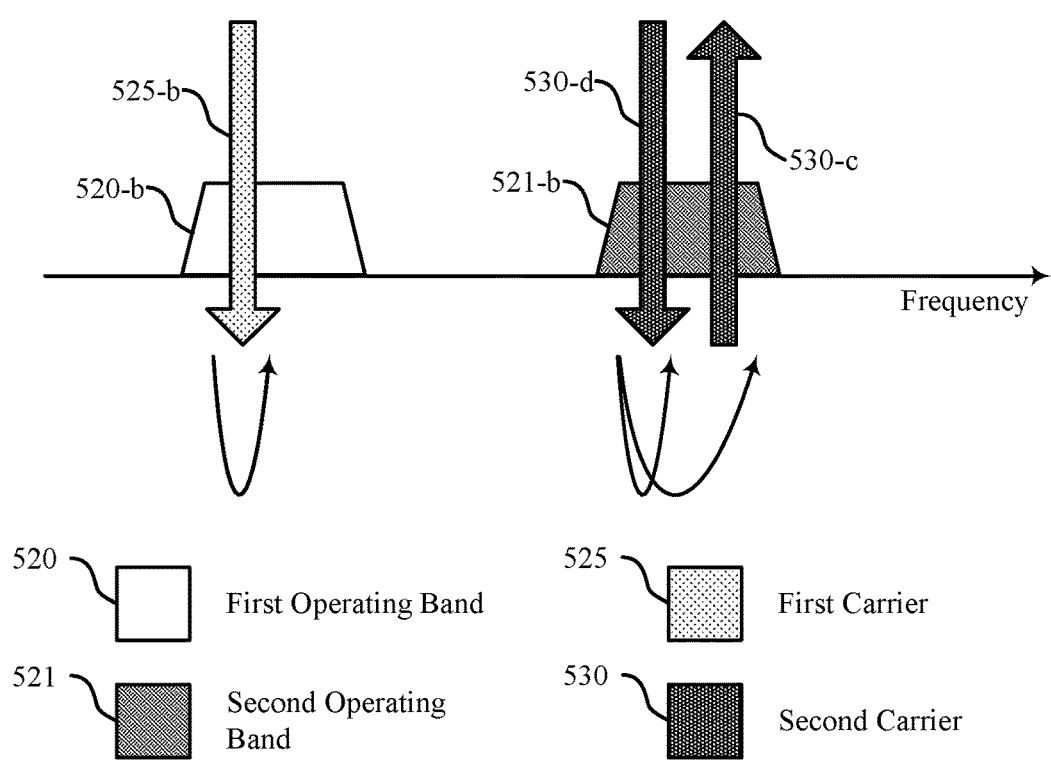

As illustrated in the example of FIG. 5B, the network may configure the UE (or the UE may be otherwise configured) with paired operating bands including a first operating band 520-b and a second operating band 521-b. In some examples, the first operating band 520-b may be used at the UE for receptions (e.g., using a first carrier 525-b), while the second operating band 521-b may be used at the UE for both transmissions (e.g., using a second carrier 530-c) and receptions (e.g., using a second carrier 530-d). Although the example of FIG. 5B illustrates the first operating band 520-b being used at the UE for receptions, it is to be understood that the first operating band 520-b may also be used at the UE for transmissions and the examples described herein should not be considered limiting to the scope covered by the claims or the disclosure. In the example of FIG. 5B, carriers (or BWPs) configured at the UE may be self-scheduled (e.g., using the corresponding carrier). For example, the UE may receive signaling (e.g., control signaling, such as one or more DCIs) using the first carrier 525-*b* that may include scheduling information for the first carrier 525-*b* (e.g., an indication of resources allocated for receiving communications, such as downlink communications or sidelink communications, at the UE using the first carrier 525-*b*). Additionally, or alternatively, the UE may receive signaling (e.g., control signaling, such as one or more DCIs) using the second carrier 530-*d* that may include scheduling information for the second carrier 530-*d* (e.g., an indication of resources allocated for receiving communications, such as downlink communications or sidelink communications, at the UE using the second carrier 530-*d*), or scheduling information for the second carrier 530-*c* (e.g., an indication of resources allocated for transmitting communications, such as uplink communications, at the UE using the second carrier 530-*c*), or both.

Figure 5C:
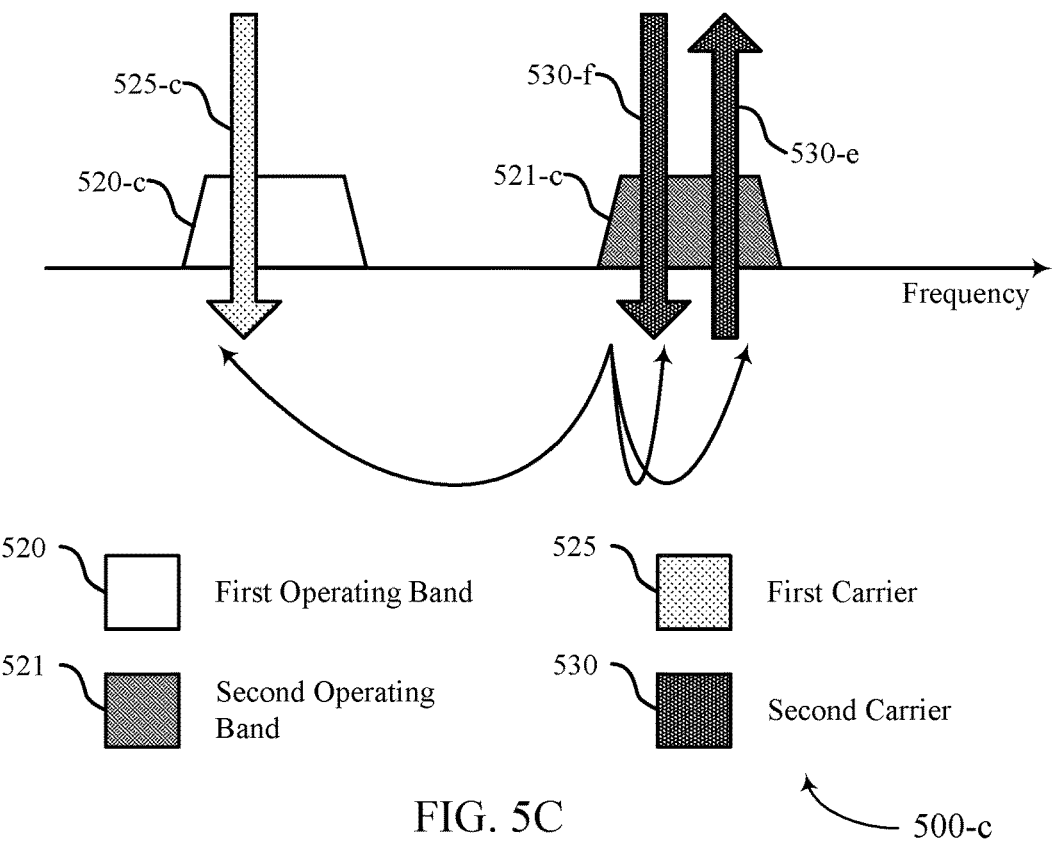

As illustrated in the example of FIG. 5C, the network may configure the UE (or the UE may be otherwise configured) with paired operating bands including a first operating band 520-*c* and a second operating band 521-*c*. In some examples, the first operating band 520-*c* may be used at the UE for receptions (e.g., using a first carrier 525-*c*), while the second operating band 521-*c* may be used at the UE for both transmissions (e.g., using a second carrier 530-*e*) and receptions (e.g., using a second carrier 530-*f*). Although the example of FIG. 5C illustrates the first operating band 520-*c* being used at the UE for receptions, it is to be understood that the first operating band 520-*c* may also be used at the UE for transmissions and the examples described herein should not be considered limiting to the scope covered by the claims or the disclosure. In the example of FIG. 5C, carriers (or BWPs) configured at the UE may be scheduled from (e.g., using) the second carrier 530-*f* (e.g., a reception carrier, a carrier of the second operating band 521-*c*, a carrier of an operating band configured at the UE for transmissions and receptions). For example, the UE may receive signaling (e.g., control signaling, such as one or more DCIs) using the second carrier 530-*f* that may include scheduling information for the first carrier 525-*c* (e.g., an indication of resources allocated for receiving communications, such as downlink communications or sidelink communications, at the UE using the first carrier 525-*c*), the second carrier 530-*e* (e.g., an indication of resources allocated for transmitting communications, such as uplink communications, at the UE using the second carrier 530-*e*), and the second carrier 530-*f* (e.g., an indication of resources allocated for receiving communications, such as downlink communications or sidelink communications, at the UE using the second carrier 530-*f*).

Figure 5D:
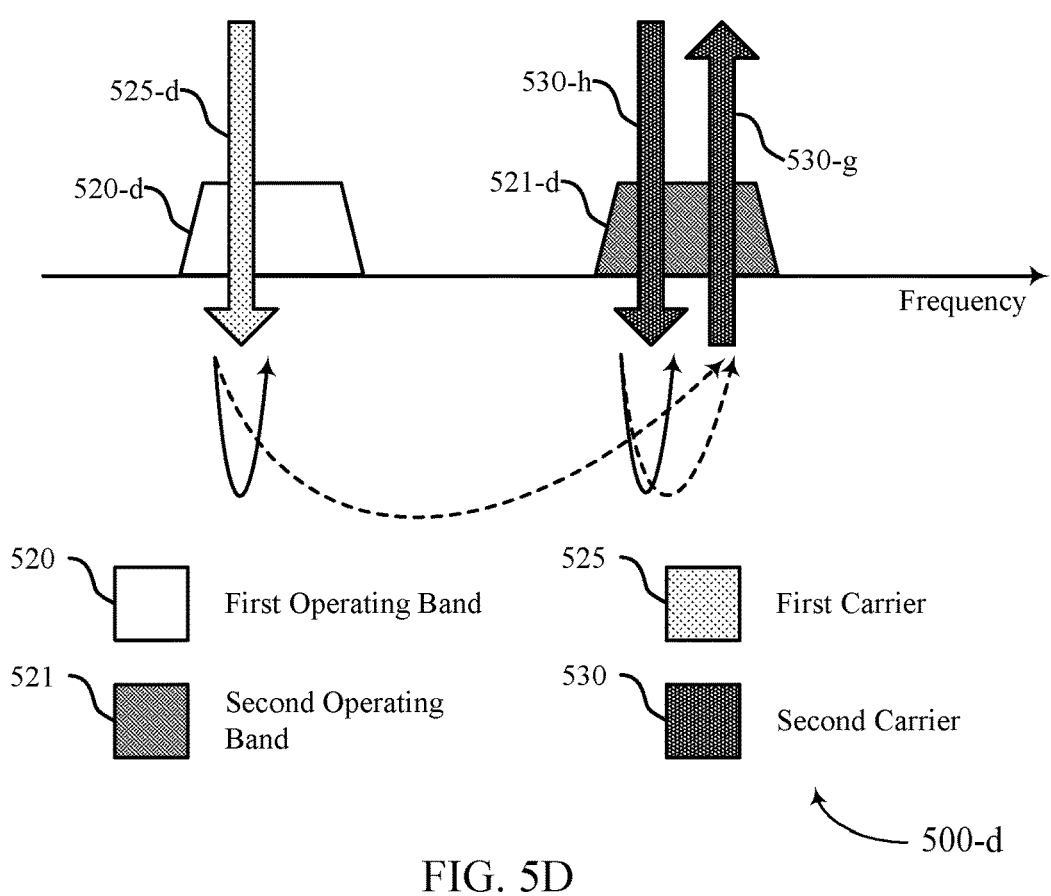

As illustrated in the example of FIG. 5D, the network may configure the UE (or the UE may be otherwise configured) with paired operating bands including a first operating band 520-*d* and a second operating band 521-*d*. In some examples, the first operating band 520-*d* may be used at the UE for receptions (e.g., using a first carrier 525-*d*), while the second operating band 521-*d* may be used at the UE for both transmissions (e.g., using a second carrier 530-*g*) and receptions (e.g., using a second carrier 530-*h*). Although the example of FIG. 5D illustrates the first operating band 520-*d* being used at the UE for receptions, it is to be understood that the first operating band 520-*d* may also be used at the UE for transmissions and the examples described herein should not be considered limiting to the scope covered by the claims or the disclosure. In the example of FIG. 5D, carriers (or BWPs) configured at the UE may be partially self-scheduled (e.g., some carriers may be scheduled using the corresponding carrier). For example, the UE may receive signaling (e.g., control signaling, such as one or more DCIs) using the first carrier 525-*d* that may include scheduling information for the first carrier 525-*d* (e.g., an indication of resources allocated for receiving communications, such as downlink communications or sidelink communications, at the UE using the first carrier 525-*d*), or scheduling information for the second carrier 530-*g* (e.g., an indication of resources allocated for transmitting communications, such as uplink communications, at the UE using the second carrier 530-*g*), or both. Additionally, or alternatively, the UE may receive signaling (e.g., control signaling, such as one or more DCIs) using the second carrier 530-*h* that may include scheduling information for the second carrier 530-*h* (e.g., an indication of resources allocated for receiving communications, such as downlink communications or sidelink communications, at the UE using the second carrier 530-*h*), or scheduling information for the second carrier 530-*g* (e.g., an indication of resources allocated for transmitting communications, such as uplink communications, at the UE using the second carrier 530-*g*), or both.

Figure 5E:
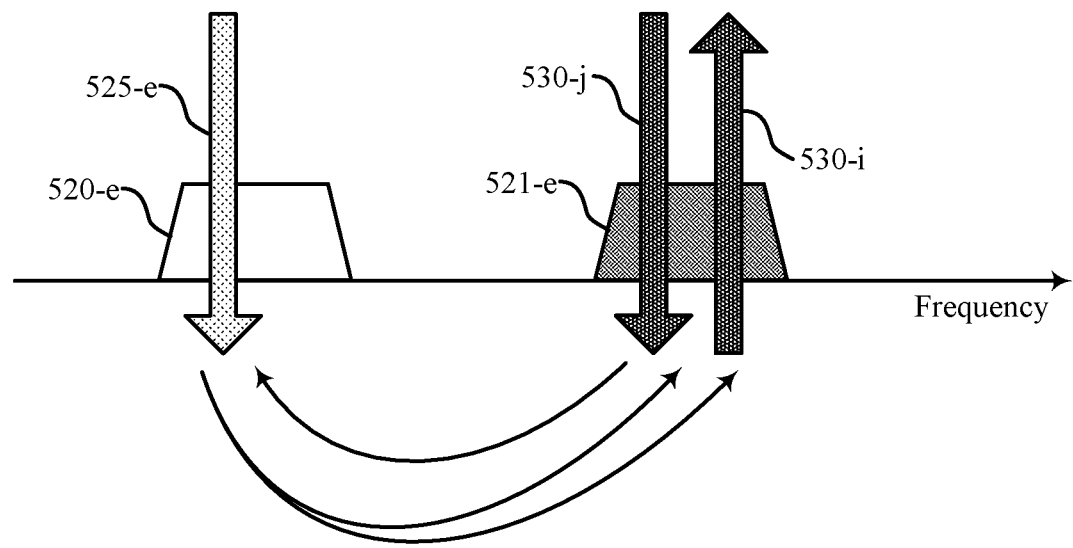
Figure 5E:
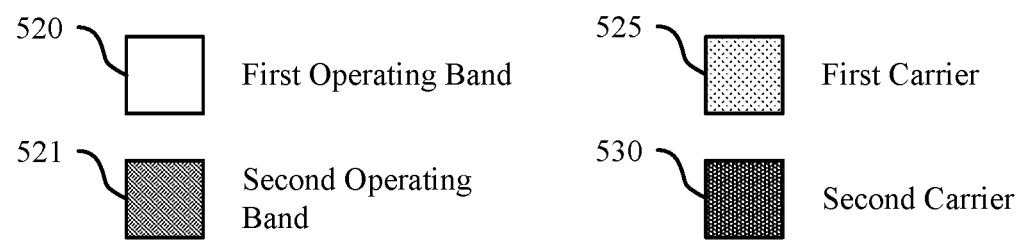

As illustrated in the example of FIG. 5E, the network may configure the UE (or the UE may be otherwise configured) with paired operating bands including a first operating band 520-*e* and a second operating band 521-*e*. In some examples, the first operating band 520-*e* may be used at the UE for receptions (e.g., using a first carrier 525-*e*), while the second operating band 521-*e* may be used at the UE for both transmissions (e.g., using a second carrier 530-*i*) and receptions (e.g., using a second carrier 530-*j*). Although the example of FIG. 5D illustrates the first operating band 520-*e* being used at the UE for receptions, it is to be understood that the first operating band 520-*e* may also be used at the UE for transmissions and the examples described herein should not be considered limiting to the scope covered by the claims or the disclosure. In the example of FIG. 5E, carriers (or BWPs) configured at the UE may be cross scheduled (e.g., a carrier may be scheduled using one or more other carriers). For example, the UE may receive signaling (e.g., control signaling, such as one or more DCIs) using the first carrier 525-*e* that may include scheduling information for the second carrier 530-*j* (e.g., an indication of resources allocated for receiving communications, such as downlink communications or sidelink communications, at the UE using the second carrier 530-*j*), or scheduling information for the second carrier 530-*i* (e.g., an indication of resources allocated for transmitting communications, such as uplink communications, at the UE using the second carrier 530-*i*), or both. Additionally, or alternatively, the UE may receive signaling (e.g., control signaling, such as one or more DCIs) using the second carrier 530-*h* that may include scheduling information for the first carrier 525-*e* (e.g., an indication of resources allocated for receiving communications, such as downlink communications or sidelink communications, at the UE using the first carrier 525-*e*).

In some examples, the UE may receive multiple scheduling information, such as multiple messages from one or more carriers including scheduling information for the corresponding carrier or one or more other carriers. In such an example, the UE may determine (e.g., distinguish) which carrier (or BWP) the scheduling information is directed to based on one or more rules (e.g., configured at the UE). For example, the UE may receive signaling (e.g., including an indication) that indicates a carrier (or BWP) the scheduling information corresponds to. In some examples, the indication may identify (e.g., indicate) a scheduled BWP (e.g., corresponding to the carrier). Additionally, or alternatively, the indication may identify (e.g., indicate) a sub-carrier indicator field (e.g., a sub-CIF, a sub-carrier indicator field corresponding to the carrier).

In some examples, the UE may be configured to perform a stop-and-wait protocol (e.g., a HARQ process), in which another packet may not be sent if the network (or the UE) is waiting for feedback on a packet (e.g., a current or previously transmitted packet), using one or more carriers. In some examples, a round-trip-time associated with one or more HARQ processes may lead to underutilization of radio resources (e.g., of the configured operating bands). In some other examples, the UE may be configured to perform multiple concurrent HARQ processes and each process may include a packet pending (e.g., one packet pending). In some examples, such as for downlink and uplink, the UE may support a quantity of HARQ processes (e.g., up to about 16 HARQ processes) per cell. In some examples, a HARQ process may apply to transmissions on a physical downlink shared channel (PDSCH) and a physical uplink shared channel (PUSCH). Additionally, or alternatively, feedback for PDSCH may be transmitted using either a physical uplink control channel (PUCCH) or PUSCH and feedback for PUSCH may be transmitted via uplink grants (e.g., due to the receiver and scheduler being at the network, such as at a gNB).

In some examples, the UE may utilize a same number of HARQ processes for one or more of the carriers (e.g., one or more first carriers 525 or one or more second carriers 530 configured at the UE). Additionally, or alternatively, the UE may use (e.g., select, prepare) one or more particular HARQ processes (e.g., dedicated HARQ processes) for one or more of the carriers (e.g., one or more first carriers 525 or one or more second carriers 530 configured at the UE). For example, the UE may use a quantity or HARQ processes (e.g., about 16 HARQ processes) for carriers with relatively lower frequencies and a quantity of HARQ processes (e.g., about 16 HARQ processes) for carriers with relatively higher carrier frequencies. In some examples, the HARQ processes used for the carriers with relatively lower frequencies may include (e.g., share) one or more same HARQ processes as may be used with the carriers with relatively higher frequencies. That is, a quantity of HARQ processes (e.g., about 16 HARQ) processes may be shared between (e.g., and used for) the carriers with relatively lower frequencies the carriers with relatively higher frequencies, respectively. In some examples, HARQ processes may be assigned for each carrier semi-statically (e.g., configured via RRC signaling, such as using a nrofHARQ-Processes-ForPDSCH IE) or determined (e.g., decided) dynamically, such as via network scheduling (e.g., using DCI).

In some examples, the UE may utilize a feedback scheme (e.g., an ACK or NACK feedback scheme) for a carrier (e.g., a single carrier). For example, the UE may fail to receive (or the network may fail to transmit) a signal on either carrier (e.g., a first carrier 525 of the first operating band 520 or a second carrier 530 of the second operating band 521). In such an example, the UE may utilize feedback based on code block groups (CBGs). For example, the UE may utilize CBG-based feedback (e.g., ACK or NACK feedback), such that the UE may transmit (e.g., may feedback) one or more ACKs or one or more NACKS per CBG (e.g., on a CBG basis) and may fail to receive (e.g., may not expected to receive, may not monitor for) a code block (CB) transmitted over one or more resources across the corresponding carrier.

Additionally, or alternatively, the UE may utilize a feedback scheme (e.g., an ACK or NACK feedback scheme) for multiple carriers (e.g., such as for carrier aggregation). For example, both carriers (e.g., the first carrier 525 of the first operating band 520 or the second carrier 530 of the second operating band 521) may be used for transmission and, as such, the UE may receive an indication (e.g., from the network) of a carrier (e.g., one or more frequency resources of a carrier) to be used to transmit feedback (e.g., an ACK or a NACK). Additionally, or alternatively, the UE may determine (e.g., assume) a same transmission configuration indicator (TCI) state for both carriers (e.g., the first carrier 525 of the first operating band 520 or the second carrier 530 of the second operating band 521).

In some examples, the UE may be configured to use a paired operating band that includes a carrier to be used for downlink reference signal reception and downlink data reception (e.g., a downlink carrier) and another carrier to be used for uplink transmission (e.g., an uplink carrier). In such examples, the UE may be configured to use the downlink carrier for reception of one or more system information blocks (SIBs) or one or more random access channel (RACH) messages, such as a second message of a four-step RACH procedure (e.g., a RACH Msg2). Additionally, or alternatively, the UE may be configured to use the uplink carrier for transmitting a physical random access channel (PRACH) message (e.g., a RACH preamble) or one or more other RACH messages, such as a first message as part of a two-step RACH procedure (e.g., a RACH MsgA).

In some examples, however, the UE may be configured to use multiple carriers for transmission, reception, or both. For example, as illustrated in the example of FIG. 5A, the UE may be configured to use both the first carrier 525-a of the first operating band 520-a and the second carrier 530-b of the second operating band 521-a for receptions (e.g., downlink reference signal receptions, downlink data receptions, sidelink receptions) and the second carrier 530-a of the second operating band 521-a for transmissions (e.g., uplink transmissions). In such an example, the UE may determine whether to use the first carrier 525-a or the second carrier 530-b to receive particular message. That is, the UE may determine one or more carriers (e.g., multiple candidate options) to use for transmitting or receiving particular messages. For example, the UE may determine one or more carriers (e.g., which carriers) to use for downlink data reception (e.g., reception of SIBs), downlink reference signal reception (e.g., reception of synchronization signal blocks (SSBs) or channel state information reference signals (CSI-RSs)), and reception of one or more messages transmitted from the network as part of a RACH procedure (e.g., a RACH Msg2 reception, such as during a four-step RACH procedure, or a RACH MsgB reception, such as during a two-step RACH procedure). Additionally, or alternatively, the UE may determine one or more carriers (e.g., which carriers) to use for one or more messages transmitted from the UE as part of a RACH procedure (e.g., a PRACH transmission, a RACH MsgA transmission, such as during a two-step RACH procedure, or a Msg1 transmission, such as during a four-step RACH procedure).

In some examples, downlink reference signals (e.g., SSBs or CSI-RSs), may be used at the UE for timing or power control. For example, for UE power control, the UE may apply an offset for a random access preamble (e.g., RACH preamble) transmission. In some examples, a value of the offset may be indicated to the UE (e.g., signaled from the network) and used at the UE, for example to compensate for downlink-uplink coupling loss. In some examples, depending on the carriers used are the UE for random access preamble transmission and downlink reference signal reception, the value of the offset (e.g., a suitable value of the offset) may vary (e.g., change, be different). For example, if random access preamble transmission and downlink reference signal reception occur using a same carrier (e.g., a relatively lower frequency carrier) the value of the offset may be set to 0 (e.g., or some other suitable value). In other examples (e.g., examples in which random access preamble transmission and downlink reference signal reception occur using different carriers), the offset may be set to a value greater than 0.

In some examples, the UE may determine to use (e.g., may select, may follow) one or more carriers that may be used as part of a default procedure. For example, the UE may select a carrier that may be used for downlink reception as part of a default procedure for downlink message receptions. Additionally, or alternatively, the UE may select a carrier that may be used for uplink transmissions as part of a default procedure for uplink message transmissions. In some examples, the UE may use multiple carriers for receptions (e.g., both the first carrier 525-a of the first operating band 520-a or the second carrier 530-b of the second operating band 521-a). Additionally, or alternatively, the UE may use multiple carriers (e.g., both carries) for transmissions and receptions. In some examples, the UE may use a carrier (e.g., a particular carrier) indicated to the UE (e.g., from the network). That is, the UE may use any combination of carriers for transmissions or receptions (or both). As an illustrative example, the UE may use a first reception carrier (e.g., the first carrier 525-a as described with reference to FIG. 5A) a second reception carrier (e.g., the second carrier 530-b as described with reference to FIG. 5A) for receptions and a transmission carrier (e.g., the second carrier 530-a as described with reference to FIG. 5A) for transmissions. In some examples, the UE may use the first reception carrier, the second reception carrier, and the transmission carrier to transmit messages or receive messages (or both) in accordance with the following Table 1:

receive messages using both the first reception carrier and the second reception carrier (e.g., all reception behavior may be enabled for the relatively lower frequency carrier and the relatively higher frequency carrier). In some examples, the UE may determine to use a carrier (e.g., may randomly select, with equal probability, a carrier from the multiple carriers) and execute the behaviors (e.g., receive messages) in the determined (e.g., selected) carrier. In such examples, preamble information (e.g., RACH preamble information, PRACH information) may be used to determine one or more carriers (e.g., distinguish which carriers) that the UE may access and use to receive (e.g., expect to receive, monitor for) a response message (e.g., a message transmitted to the UE in response to the UE transmitting a PRACH message, such as a RACH Msg2 or a RACH MsgB).

Additionally, or alternatively, the UE may be configured to receive some messages using both the first reception carrier and the second reception carrier. For example, the reception behavior of the second reception carrier (e.g., the relatively lower frequency carrier) may exclude SSB and SIB reception. In such an example, the UE may detect (e.g., read) the SSB or SIB (or both) using the first reception carrier (e.g., the relatively higher frequency carrier) and execute remaining receptions (e.g., leftovers) using either of carriers (e.g., the first reception carrier, the second reception carrier, or both). In some examples, such carriers (e.g., the first reception carrier, the second reception carrier, or both) may be selected at the UE (e.g., randomly and with equal probability) or indicated to the UE, such as from the network. Additionally, or alternatively, the preamble information (e.g., RACH preamble information, PRACH information) may be used at the UE to determine one or more carriers (e.g., to distinguish which carriers) the UE may access and use to receive (e.g., expect to receive, monitor for) a response message (e.g., a message transmitted to the UE in response to the PRACH message, such as a RACH Msg2 or a RACH MsgB).

Additionally, or alternatively, the UE may be configured to receive some messages using both the first reception

TABLE 1

| First Reception Carrier | Second Reception Carrier | Transmission Carrier |
| --- | --- | --- |
| Reception of: SSB, SIB, downlink reference signals, RACH Msg2, RACH MsgB | — | Transmission of: PRACH, RACH MsgA |
| Reception of: SSB, SIB, downlink reference signals, RACH Msg2, RACH MsgB | Reception of: SSB, SIB, downlink reference signals, RACH Msg2, RACH MsgB | Transmission of: PRACH, RACH MsgA |
| Reception of: SSB, SIB, downlink reference signals, RACH Msg2, RACH MsgB | Reception of: downlink reference signals, RACH Msg2, RACH MsgB | Transmission of: PRACH, RACH MsgA |
| Reception of: SSB, SIB, downlink reference signals, RACH Msg2, RACH MsgB | Reception of: RACH Msg2, RACH MsgB | Transmission of: PRACH, RACH MsgA |
| — | Reception of: SSB, SIB, downlink reference signals, RACH Msg2, RACH MsgB | Transmission of: PRACH, RACH MsgA |
| Reception of: SSB, SIB | Reception of: downlink reference signals, RACH Msg2, RACH MsgB | Transmission of: PRACH, RACH MsgA |
| Reception of: SSB/SIB, downlink reference signals | Reception of: RACH Msg2, RACH MsgB | Transmission of: PRACH, RACH MsgA |

In some examples, the first reception carrier may include relatively higher frequencies and the second reception carrier (e.g., and the transmission carrier) may include relatively lower frequencies. In such examples (e.g., and in accordance with Table 1), the UE may be configured to carrier and the second reception carrier. For example, the reception behavior of the second reception carrier (e.g., the relatively lower frequency carrier) may exclude SSB and SIB reception and downlink reference signal reception. In such an example, the UE may detect (e.g., read) the SSB or SIB (or both) using the first reception carrier (e.g., the relatively higher frequency carrier) and identify the first reception carrier as a downlink reference (e.g., may set the downlink reference, may identify the first reception carrier as a carrier to use for reception of downlink reference signals). The UE may execute remaining receptions (e.g., leftovers) using either or both of the carriers (e.g., the first reception carrier, the second reception carrier, or both). In some examples, such carriers (e.g., the first reception carrier, the second reception carrier, or both) may be selected at the UE (e.g., randomly and with equal probability) or indicated to the UE (e.g., from the network). Additionally, or alternatively, the preamble information (e.g., RACH preamble information, PRACH information) may be used at the UE to determine one or more carriers (e.g., to distinguish which carriers) the UE may access and use to receive (e.g., expect to receive, monitor for) a response message (e.g., a message transmitted to the UE in response to the PRACH message, such as a RACH Msg2 or a RACH MsgB).

Additionally, or alternatively, the network may configure the UE (or the UE may be otherwise configured) to receive messages using the second reception carrier and transmit messages using the transmission carrier (e.g., a same carrier may be used for transmission and reception). That is, reception behavior (e.g., all reception behavior) may be enabled for the second reception carrier (e.g., the relatively lower frequency carrier). In such an example, the UE may execute RACH messages (e.g., up to RACH Msg2 or a RACH MsgB) using the second reception carrier (e.g., the relatively lower frequency carrier) and UE specific scheduling (e.g., reception of a RACH Msg4, reception of messages subsequent to the RACH Msg4) may be performed using the second reception carrier or the first reception carrier (e.g., the relatively higher frequency carrier), or both.

Additionally, or alternatively, the network may configure the UE (or the UE may be otherwise configured) to receive SSB and SIB using the first reception carrier (e.g., the relatively higher frequency carrier) and reception of other messages (e.g., leftovers) may be enabled for the second reception carrier (e.g., the relatively higher frequency carrier). In such an example, the UE may execute RACH messages (e.g., up to RACH Msg2 or a RACH MsgB) using the second reception carrier (e.g., the relatively lower frequency carrier) and UE specific scheduling (e.g., reception of a RACH Msg4, reception of messages subsequent to the RACH Msg4) may be performed using the second reception carrier or the first reception carrier (e.g., the relatively higher frequency carrier), or both.

Additionally, or alternatively, the network may configure the UE (or the UE may be otherwise configured) to receive SSB, SIB, and downlink reference signals using the first reception carrier (e.g., the relatively higher frequency carrier) and reception of other messages (e.g., leftovers) may be enabled for the second reception carrier (e.g., the relatively higher frequency carrier). In such an example, the UE may execute RACH messages (e.g., up to RACH Msg2 or a RACH MsgB) using the second reception carrier (e.g., the relatively lower frequency carrier) and UE specific scheduling (e.g., reception of a RACH Msg4, reception of messages subsequent to the RACH Msg4) may be performed using the second reception carrier or the first reception carrier (e.g., the relatively higher frequency carrier), or both.

In some examples, the relatively higher frequency carrier may be configured at the UE for transmissions. In such examples, PRACH or RACH MsgA transmissions may be enabled for both carriers (e.g., the relatively higher frequency carrier and the relatively lower frequency carrier). In such examples, the UE may determine to use the relatively higher frequency carrier or the relatively lower frequency carrier (e.g., select either transmission carrier, such as randomly with equal probability) for the transmissions. In some examples, the UE may use (e.g., take) an identifier in a random access radio network temporary identifier (RA-RNTI) calculation, such that the network (e.g., a gNB) may multiplex a response message (e.g., one or more random access response (RARs)) for the random access preamble (e.g., included in the PRACH or RACH Msg4 transmission) transmitted on the multiple (e.g., different carriers, the relatively higher frequency carrier and the relatively lower frequency carrier), in one MAC protocol data unit (PDU). For such an identifier, the UE may receive (e.g., the network may introduce) a carrier indicator. That is, the network may transmit a carrier indicator to identify the identifier in the RA-RNTI calculation to the UE. Additionally, or alternatively, one or more random access preamble resources (e.g., resources allocated to the UE for transmitting a random access preamble, such as in a PRACH message or a RACH MsgA) may be coordinated across the carriers. In some examples, coordinating random access preamble resources across the carriers may distinguish the RARs (e.g., identify which carrier is to be used to receive a particular RAR). In some examples, such coordination information (e.g., association information) may be indicated (e.g., signaled) to the UE from the network. In such examples, for power control, the UE may apply a respective offset to the relatively higher frequency carrier and the relatively lower frequency carrier for the random access preamble transmission.

Additionally, or alternatively, in some examples, the relatively lower frequency carrier and the relatively higher frequency carrier may both be used for transmissions and receptions. For example, the UE may use both the relatively lower frequency carrier and the relatively higher frequency carrier for transmission of a PRACH message (or a RACH MsgA) and reception of a SSB, a SIB, downlink reference signals, and a RACH Msg2 (or RACH MsgB). In some examples, such a combination (e.g., using the relatively lower frequency carrier and the relatively higher frequency carrier for transmissions and receptions) may be used at the UE for increased traffic conditions (e.g., relatively heavy transmission and relatively heavy receptions).

In some examples of increased traffic conditions, such as examples in which transmission may be relatively heavy, the UE may maintain one or more timing advance values for the multiple carriers. For example, the UE may use a common timing advance value for the relatively lower frequency carrier and the relatively higher frequency carrier. Additionally, or alternatively, the UE may use multiple (e.g., different) timing advance values for the relatively lower frequency carrier and the relatively higher frequency carrier. In some examples, the UE may refrain from using a common timing value if a frequency difference between the carriers is relatively large (e.g., if the carriers are separated in a frequency domain by a relatively large quantity of frequencies). For example, if a frequency difference between the carriers is relatively large the UE may determine to use multiple (e.g., different) timing advance values for the multiple carriers. In such an example, the UE may maintain (e.g., store) multiple timing advance groups (TAGs), which may each be associated with a respective timing advance value and timing advance timer, and may establish timing advance values for the carriers (e.g., separately for the carriers, such as via a random access procedure). In some examples, the UE may receive an indication (e.g., signaling, such as from the network) of whether a single (e.g., common) timing advance value or multiple timing advance values are to be applied at the network (e.g., for the multiple carriers) and the corresponding (e.g., related) configuration (e.g., a corresponding TAG identifier and timing advance timer value).

In some examples, the UE may perform measurements (e.g., reference signal measurements) using one or both of the carriers. For example, L3 level and L1 level (or beam level) measurement may be supported at the UE using SSBs or CSI-RSs (or both). In some examples, both carriers of the paired operating bands (e.g., the relatively higher frequency carrier and the relatively lower frequency carrier) may support reception of SSBs or CSI-RSs (or both). In such examples, the UE and the network (e.g., a gNB) may determine (e.g., communicate) which carrier the UE may use for performing the measurements (e.g., the L3 level measurements, the L1 level measurements). In some examples, the UE may be configured (e.g., via the network or otherwise) to use the relatively lower frequency carrier, the relatively higher frequency carrier, a carrier with a relatively lowest index, a carrier with a relatively highest index, a default carrier configured for receptions at the UE, or any combination thereof. For example, the UE may receive an indication (e.g., signaling) that may identify one or more carriers (e.g., which carrier) the UE may use for performing reference signal measurements. In some examples, the UE may report (e.g., indicate to the network) information regarding the one or more carriers (e.g., which carrier) used at the UE for the measurements with corresponding measurement results for the network (e.g., the gNB).

Additionally, or alternatively, the UE may report one or more measurement capabilities (e.g., an L1 capability, an L2 capability) to the network. For example, the UE may report a transmission-reception ratio (e.g., and more than one patterns associated with the transmission-reception ratio). Additionally, or alternatively, the UE may report duplex capabilities (e.g., a full-duplex capability, a half-duplex capability). In some examples, a throughput calculation (e.g., performed at the UE or the network entity) may be performed based on the reported (e.g., supported) transmission-reception ratio (or according to one or more other calculation methods). Additionally, or alternatively, the UE may report a timing capability (e.g., a processing capability, a switching time capability between transmissions and receptions) of the UE to the network. In some examples, the UE may report a capability of the UE to calculate an L2 buffer size with a throughput calculation.

Figure 6:
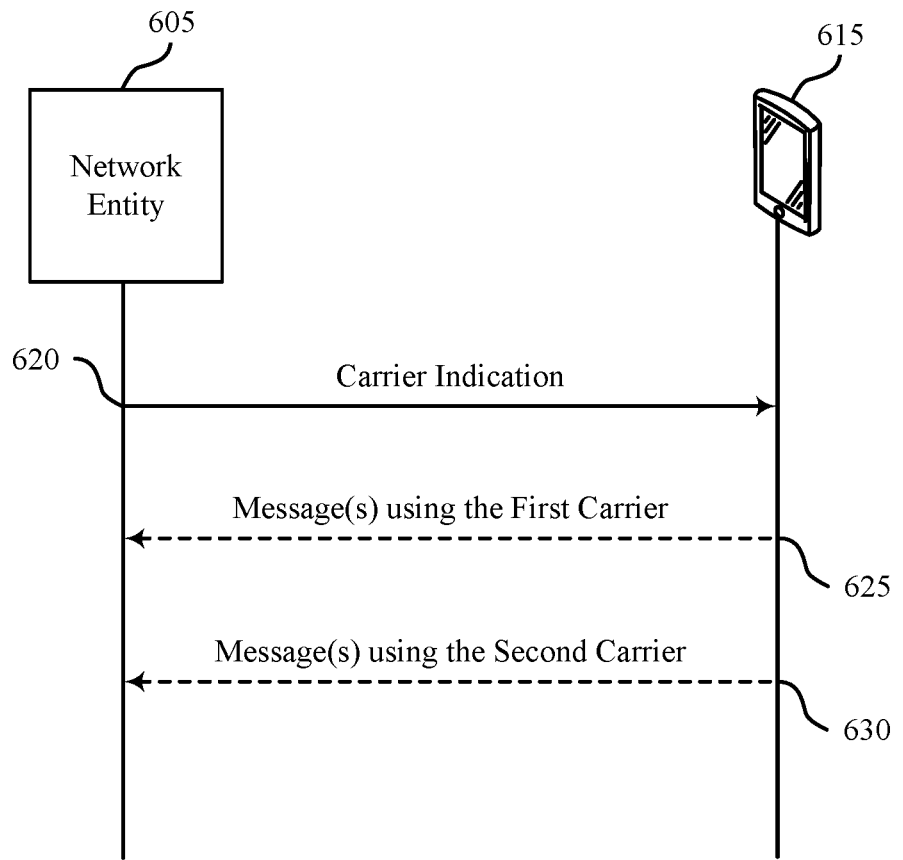
FIG. 6 illustrates an example of a process flow that supports flexible channel structure for paired radio frequency spectrum bands in accordance with one or more aspects of the present disclosure.

FIG. 6 illustrates an example of a process flow 600 that supports flexible channel structure for paired radio frequency spectrum bands in accordance with one or more aspects of the present disclosure. In some examples, the process flow 600 may implement aspects of the wireless communications system 100, the wireless communications system 200, the carrier configuration diagram 300, the resource allocation diagrams 400. For example, the process flow 600 may be implemented at a UE 615 and a network entity 605, which may be examples of the corresponding devices as described with reference to FIGS. 1 through 3, 4A, 4B, 5A, 5B, 5C, 5D, and 5E.

In some examples, the UE 615 and the network entity 605 may support TDD and FDD using a paired operating band. For example, at 620, the UE 615 may receive control signaling (e.g., from the network entity 605) that includes a carrier indication of a configuration for wireless communications with a wireless device (e.g., the network entity 605) using a first operating band (e.g., a paired operating band) of a radio frequency spectrum band (e.g., FR1, FR2). The carrier indication may be an example of a carrier indication as described with reference to FIG. 2. For example, the carrier indication may identify that the first operating band includes a first carrier that is paired with a second carrier. The first carrier may be separated in frequency from the second carrier and used for one of transmissions from the UE 615 or receptions at the UE 615, while the second carrier may be used for both transmissions from the UE 615 and receptions at the UE 615. The UE 615 may use the second carrier for both transmissions and receptions using TDD according to the configuration.

In some examples, the UE 615 may concurrently communicate messages with the network entity 605 using the first carrier and the second carrier. For example, at 625 and 630, respectively, the UE 115 may concurrently transmit multiple messages to the network entity 605 using the first carrier and the second carrier.

Figure 7:
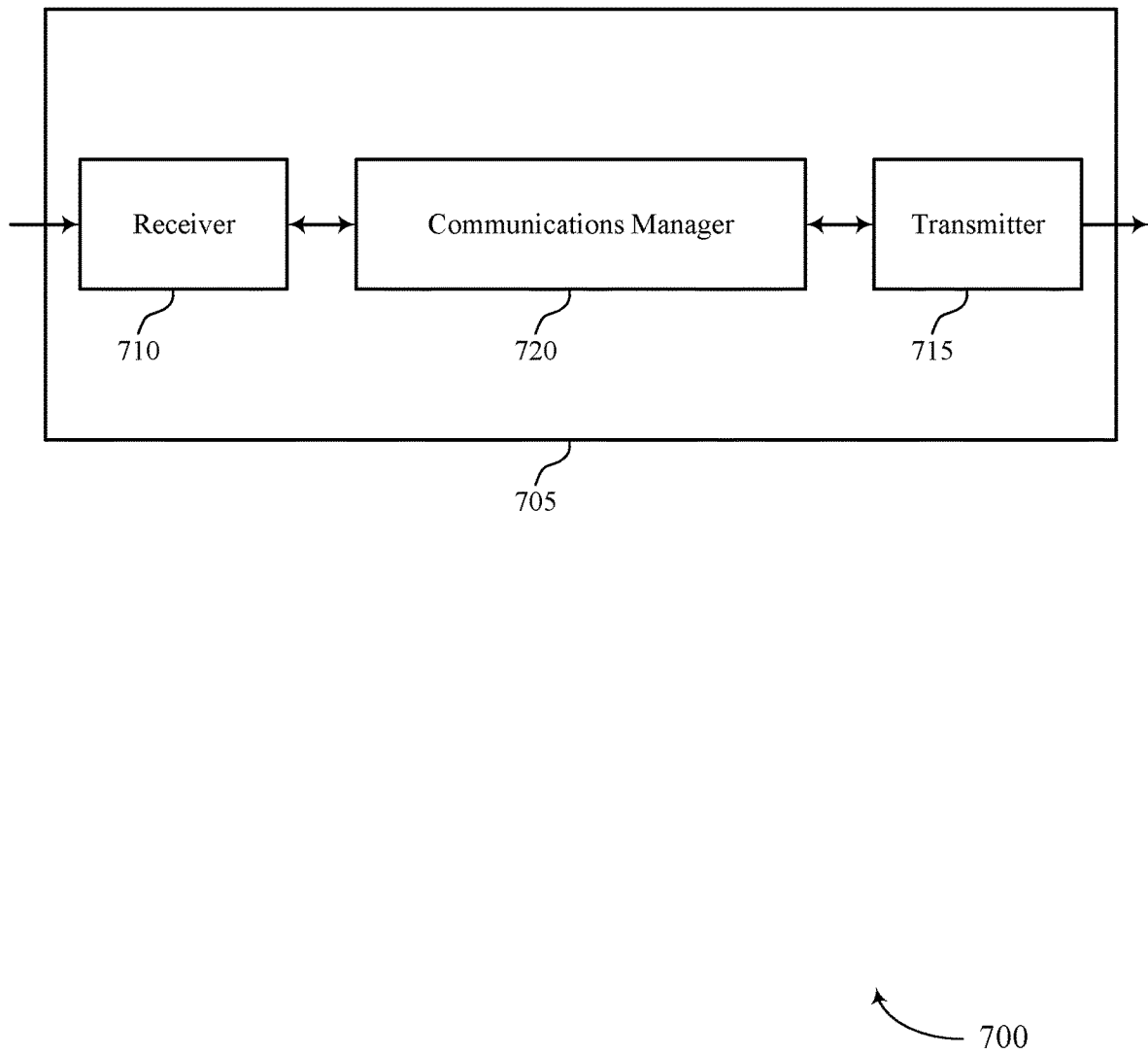
FIGS. 7 and 8 show block diagrams of devices that support flexible channel structure for paired radio frequency spectrum bands in accordance with one or more aspects of the present disclosure.

FIG. 7 shows a block diagram 700 of a device 705 that supports flexible channel structure for paired radio frequency spectrum bands in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to flexible channel structure for paired radio frequency spectrum bands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to flexible channel structure for paired radio frequency spectrum bands). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of flexible channel structure for paired radio frequency spectrum bands as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE (e.g., the device 705) in accordance with examples as disclosed herein. For example, the communications manager 720 may be configured as or otherwise support a means for receiving control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration. The communications manager 720 may be configured as or otherwise support a means for communicating concurrently a plurality of messages with the wireless device using the first carrier and the second carrier.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
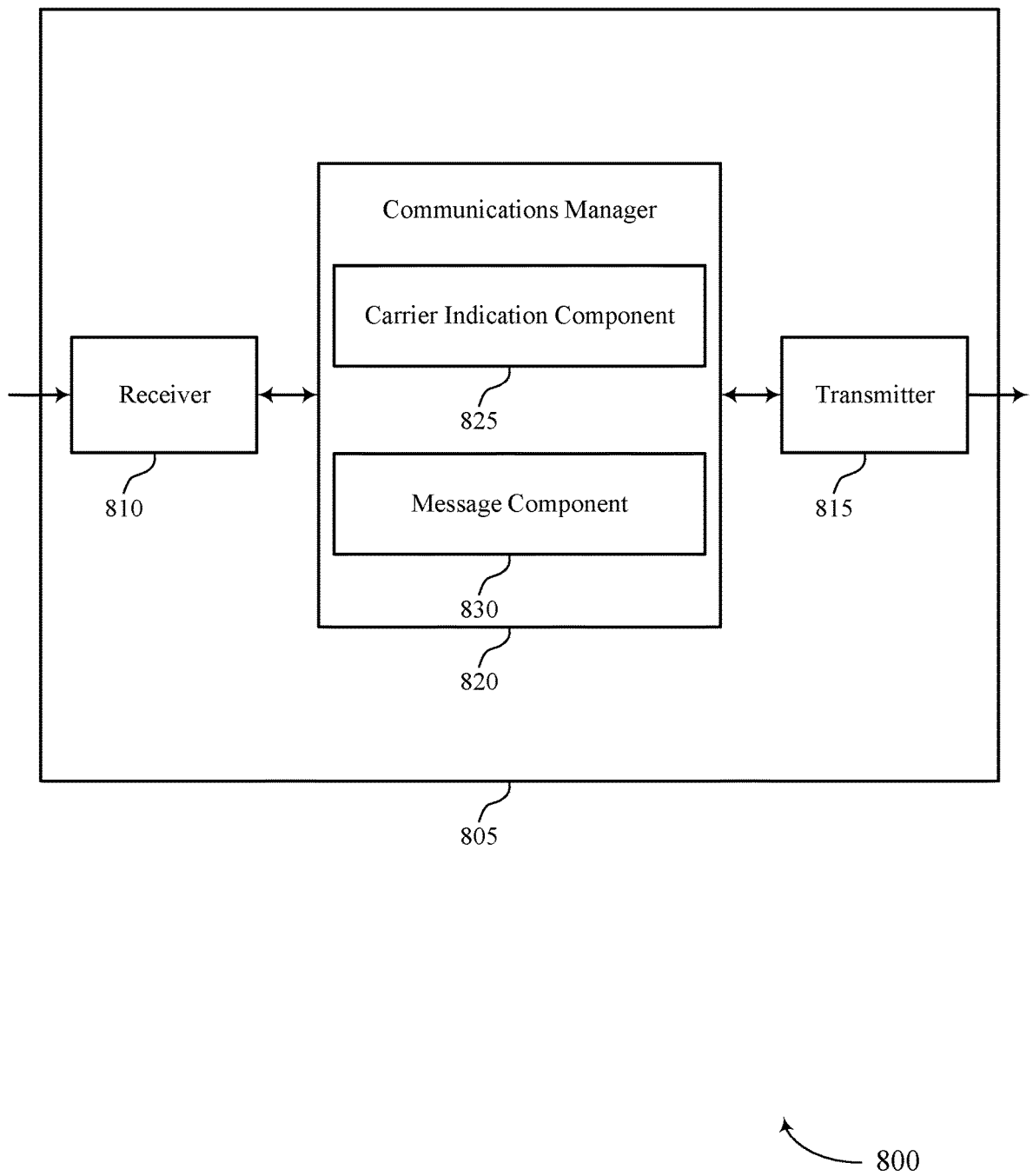

FIG. 8 shows a block diagram 800 of a device 805 that supports flexible channel structure for paired radio frequency spectrum bands in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to flexible channel structure for paired radio frequency spectrum bands). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to flexible channel structure for paired radio frequency spectrum bands). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of flexible channel structure for paired radio frequency spectrum bands as described herein. For example, the communications manager 820 may include a carrier indication component 825 a message component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE (e.g., the device 805) in accordance with examples as disclosed herein. The carrier indication component 825 may be configured as or otherwise support a means for receiving control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration. The message component 830 may be configured as or otherwise support a means for communicating concurrently a plurality of messages with the wireless device using the first carrier and the second carrier.

Figure 9:
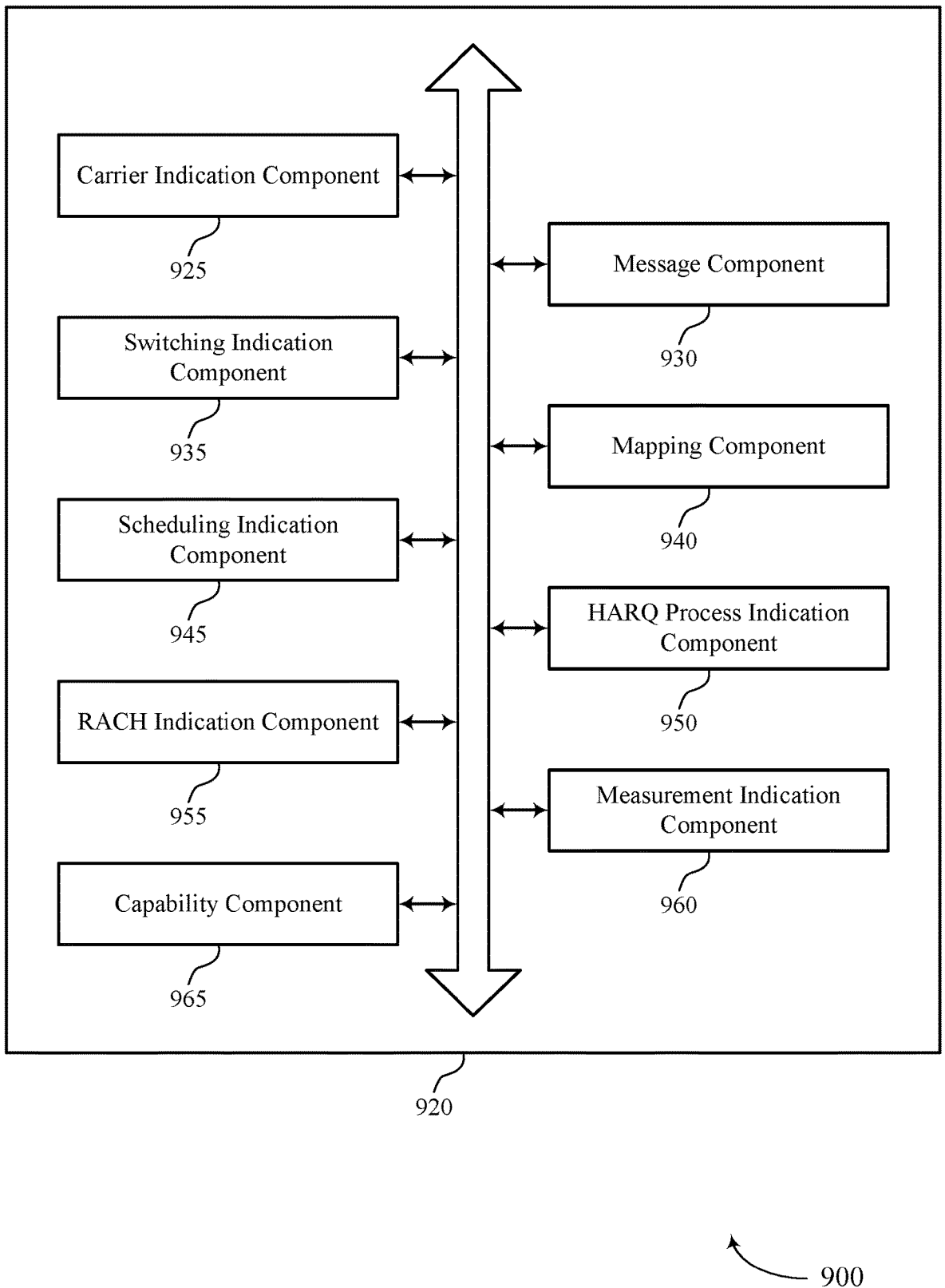
FIG. 9 shows a block diagram of a communications manager that supports flexible channel structure for paired radio frequency spectrum bands in accordance with one or more aspects of the present disclosure.

FIG. 9 shows a block diagram 900 of a communications manager 920 that supports flexible channel structure for paired radio frequency spectrum bands in accordance with one or more aspects of the present disclosure. The communications manager 920 may be an example of aspects of a communications manager 720, a communications manager 820, or both, as described herein. The communications manager 920, or various components thereof, may be an example of means for performing various aspects of flexible channel structure for paired radio frequency spectrum bands as described herein. For example, the communications manager 920 may include a carrier indication component 925, a message component 930, a switching indication component 935, a mapping component 940, a scheduling indication component 945, an HARQ process indication component 950, a RACH indication component 955, a measurement indication component 960, a capability component 965, or any combination thereof. Each of these components may communicate, directly or indirectly, with one another (e.g., via one or more buses).

The communications manager 920 may support wireless communication at a UE in accordance with examples as disclosed herein. The carrier indication component 925 may be configured as or otherwise support a means for receiving control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration. The message component 930 may be configured as or otherwise support a means for communicating concurrently a plurality of messages with the wireless device using the first carrier and the second carrier.

In some examples, to support receiving the control signaling that includes the indication, the carrier indication component 925 may be configured as or otherwise support a means for receiving a first indication of the first carrier paired with the second carrier in the first operating band and a second indication of the second carrier identifying that the second carrier is unpaired, wherein the second carrier is used for both transmissions from the UE and receptions at the UE based at least in part on the first indication and the second indication.

In some examples, to support receiving the control signaling, the carrier indication component 925 may be configured as or otherwise support a means for receiving a second indication that the first carrier is to be used for frequency division duplexing or for supplemental downlink at the UE and the second carrier is to be used for time division duplexing at the UE, wherein the first carrier is used for transmissions from the UE or receptions at the UE and the second carrier is used for transmissions from the UE and receptions at the UE based at least in part on the second indication.

In some examples, the switching indication component 935 may be configured as or otherwise support a means for receiving second control signaling that includes a second indication for the UE to switch from one of transmitting from the UE or receiving at the UE using the first carrier for a first set of time intervals to a different one of transmitting from the UE or receiving at the UE using the second carrier for a second set of time intervals.

In some examples, the second indication includes an indication for the UE to switch from using a first bandwidth part corresponding to the one of transmitting from the UE or receiving at the UE using the first carrier to using a second bandwidth part corresponding to the different one of transmitting from the UE or receiving at the UE using the second carrier.

In some examples, the mapping component 940 may be configured as or otherwise support a means for receiving second control signaling that identifies a mapping between a channel and two or more of downlink, uplink, or sidelink, wherein the channel comprises a quality of service flow, a radio bearer, a radio link control channel or bearer, logical channel, wherein communicating the plurality of messages is based at least in part on the mapping.

In some examples, the scheduling indication component 945 may be configured as or otherwise support a means for receiving second control signaling that includes a second indication scheduling a first message to be communicated using a first one or more resources from a resource pool and a second message to be communicated using a second one or more resources from the resource pool, wherein the first one or more resources are associated with the first carrier and the second one or more resources are associated with the second carrier, and wherein communicating the plurality of messages is based at least in part on the second indication.

In some examples, the scheduling indication component 945 may be configured as or otherwise support a means for receiving first scheduling information for a first message of the plurality of messages to be communicated using the first carrier and second scheduling information for a second message of the plurality of messages to be communicated using the second carrier, the first carrier and the second carrier being separately scheduled.

In some examples, the HARQ process indication component 950 may be configured as or otherwise support a means for receiving second control signaling that includes a second indication of a first quantity of hybrid automatic repeat request processes associated with the first carrier and a second quantity of hybrid automatic repeat request processes associated with the second carrier.

In some examples, the first carrier and the second carrier are used at least for transmissions from the UE, and the carrier indication component 925 may be configured as or otherwise support a means for receiving second control signaling that includes a second indication for the UE to use the first carrier, the second carrier, or both, for transmitting feedback associated with communicating the plurality of messages.

In some examples, the RACH indication component 955 may be configured as or otherwise support a means for receiving second control signaling that includes a second indication identifying at least one type of signal to be transmitted from the UE or received at the UE using the first carrier during a random access procedure and at least one respective type of signal to be transmitted from the UE and received at the UE using the second carrier during the random access procedure.

In some examples, the second control signaling further includes a third indication of a first timing advance value to be used at the UE for the first carrier and a second timing advance value to be used at the UE for the second carrier.

In some examples, the measurement indication component 960 may be configured as or otherwise support a means for receiving second control signaling that includes a second indication for the UE to use the first carrier, the second carrier, or both, for performing received power measurements for channel state information reporting.

In some examples, the capability component 965 may be configured as or otherwise support a means for transmitting second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

Figure 10:
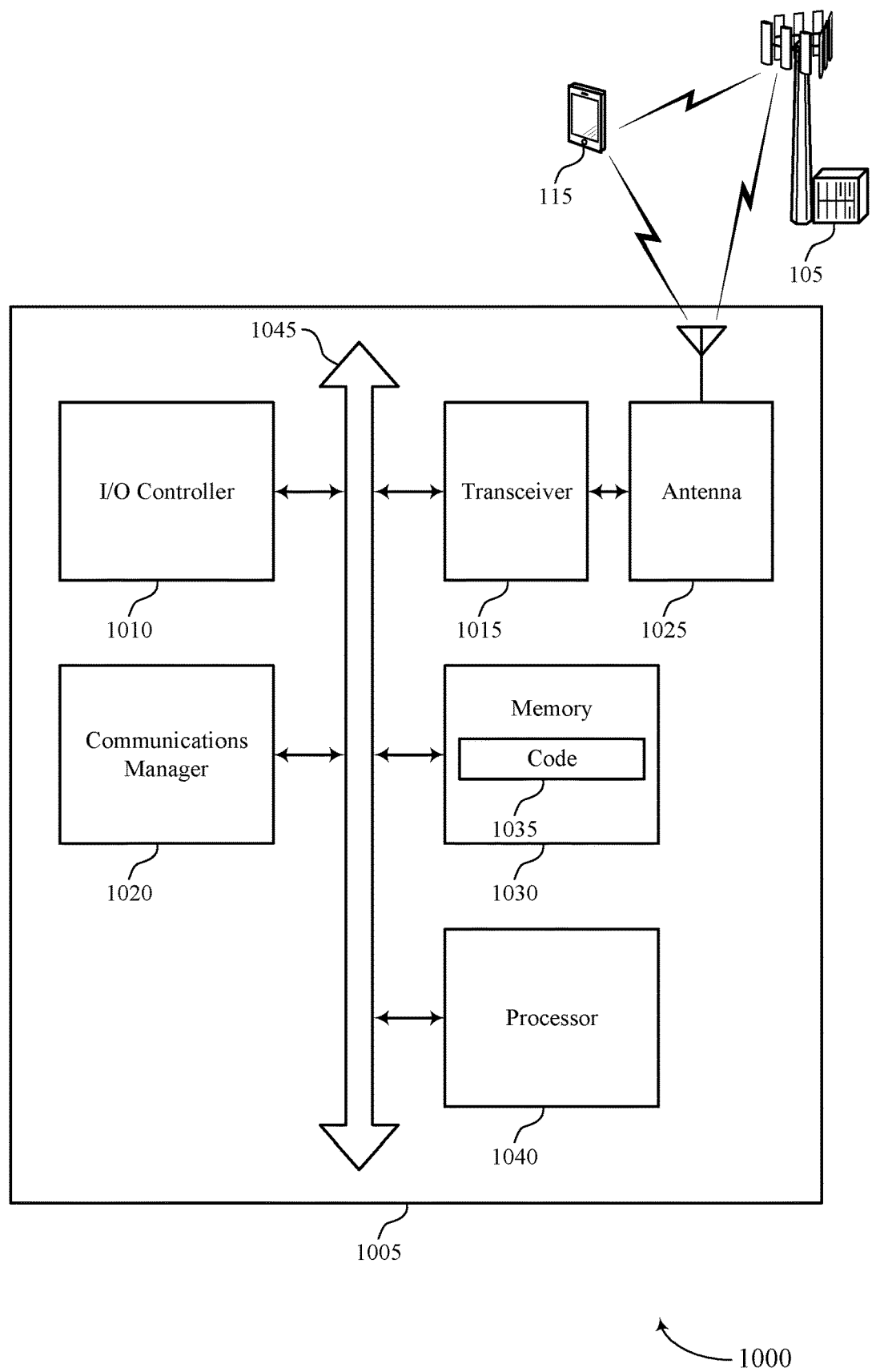
FIG. 10 shows a diagram of a system including a device that supports flexible channel structure for paired radio frequency spectrum bands in accordance with one or more aspects of the present disclosure.

FIG. 10 shows a diagram of a system 1000 including a device 1005 that supports flexible channel structure for paired radio frequency spectrum bands in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting flexible channel structure for paired radio frequency spectrum bands). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE (e.g., the device 1005) in accordance with examples as disclosed herein. For example, the communications manager 1020 may be configured as or otherwise support a means for receiving control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration. The communications manager 1020 may be configured as or otherwise support a means for communicating concurrently a plurality of messages with the wireless device using the first carrier and the second carrier.

By including or configuring the communications manager 1020 in accordance with examples as described herein, the device 1005 may support techniques for communication reliability, reduced latency, improved user experience related to reduced processing, and more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of flexible channel structure for paired radio frequency spectrum bands as described herein, or the processor 1040 and the memory 1030 may be otherwise configured to perform or support such operations.

Figure 11:
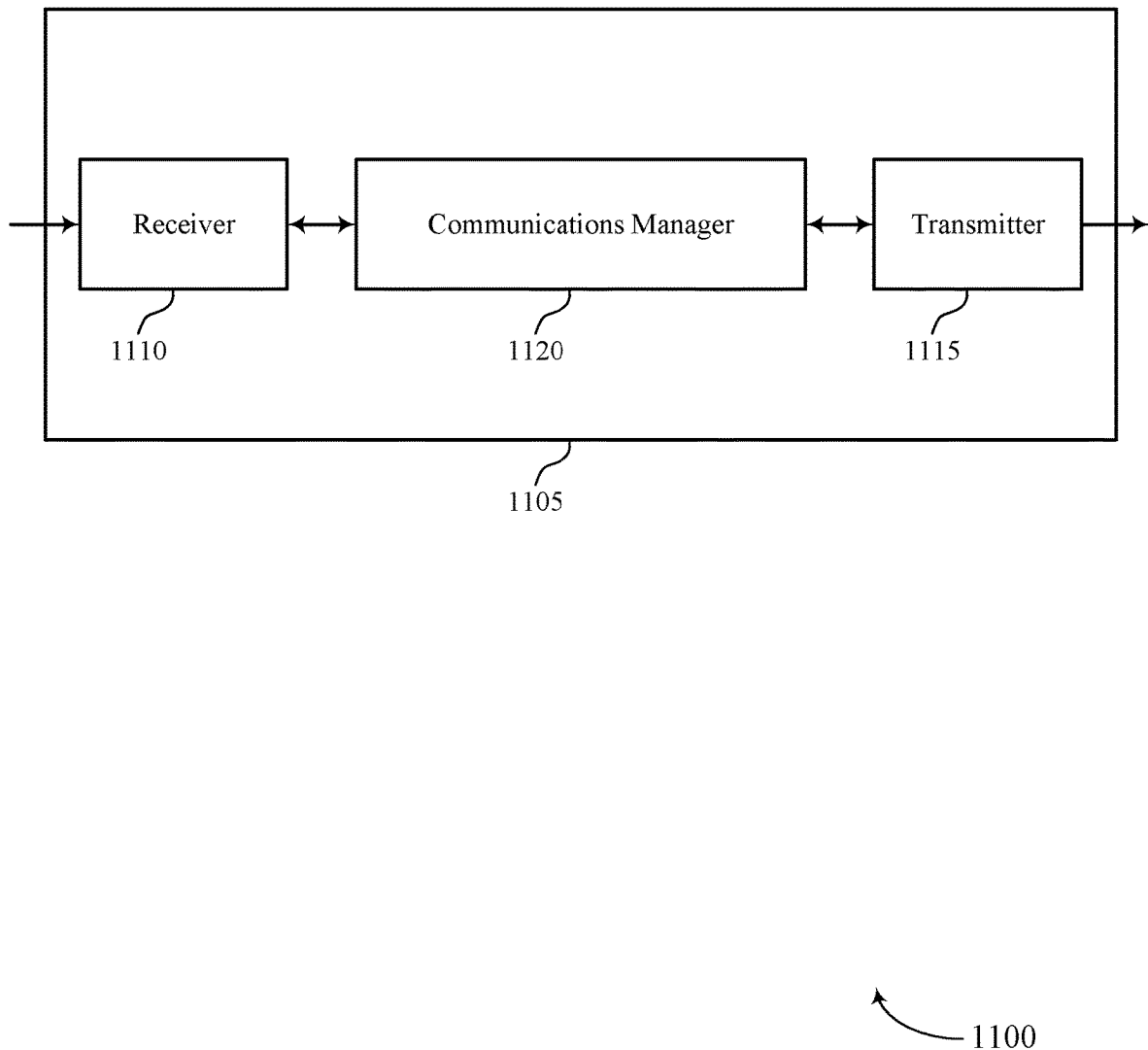
FIGS. 11 and 12 show block diagrams of devices that support flexible channel structure for paired radio frequency spectrum bands in accordance with one or more aspects of the present disclosure.

FIG. 11 shows a block diagram 1100 of a device 1105 that supports flexible channel structure for paired radio frequency spectrum bands in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of flexible channel structure for paired radio frequency spectrum bands as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity (e.g., the device 1105) in accordance with examples as disclosed herein. For example, the communications manager 1120 may be configured as or otherwise support a means for transmitting control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration. The communications manager 1120 may be configured as or otherwise support a means for communicating concurrently a plurality of messages with the wireless device using the first carrier and the second carrier.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
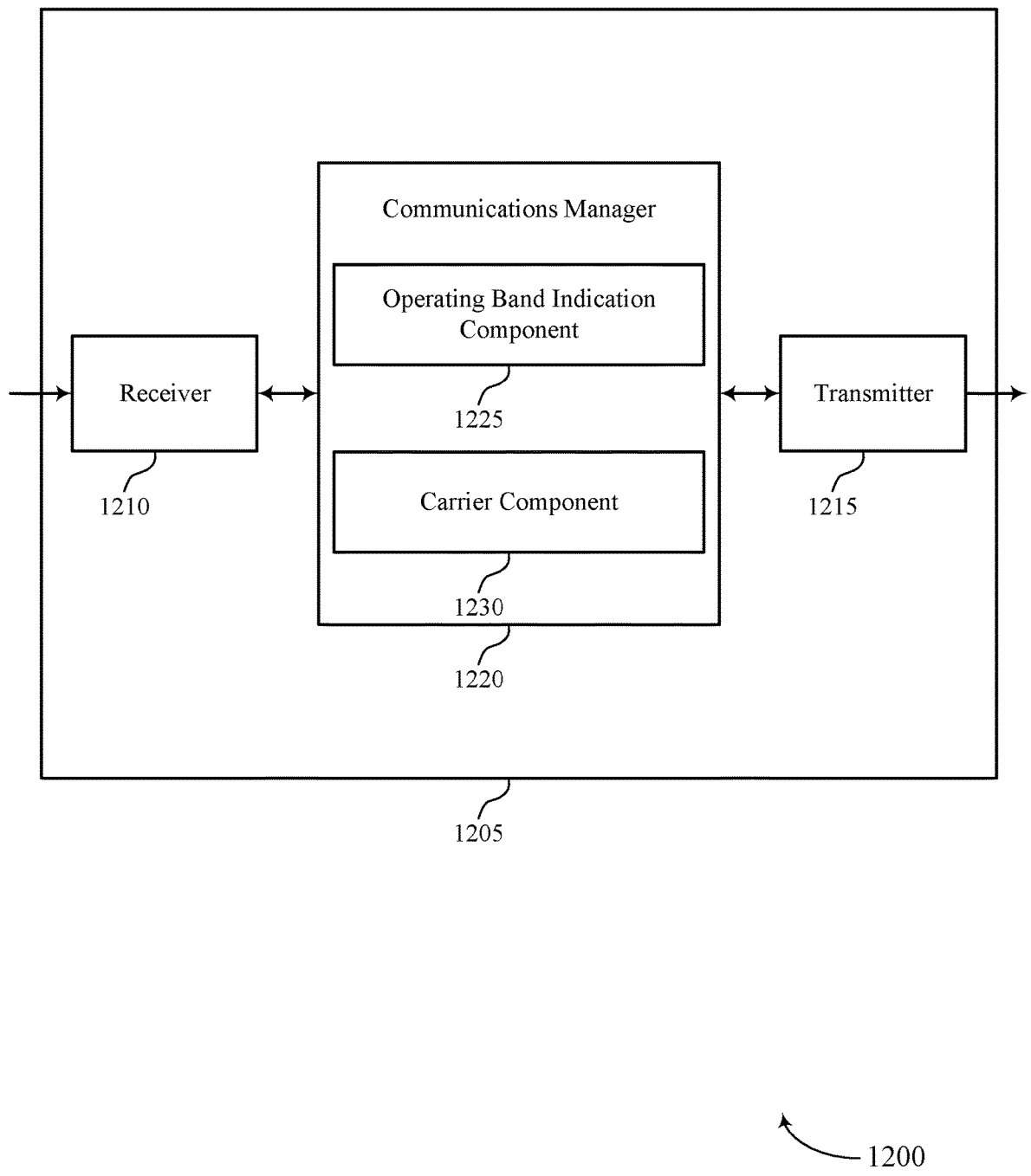

FIG. 12 shows a block diagram 1200 of a device 1205 that supports flexible channel structure for paired radio frequency spectrum bands in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of flexible channel structure for paired radio frequency spectrum bands as described herein. For example, the communications manager 1220 may include an operating band indication component 1225 a carrier component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity (e.g., the device 1205) in accordance with examples as disclosed herein. The operating band indication component 1225 may be configured as or otherwise support a means for transmitting control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration. The carrier component 1230 may be configured as or otherwise support a means for communicating concurrently a plurality of messages with the wireless device using the first carrier and the second carrier.

Figure 13:
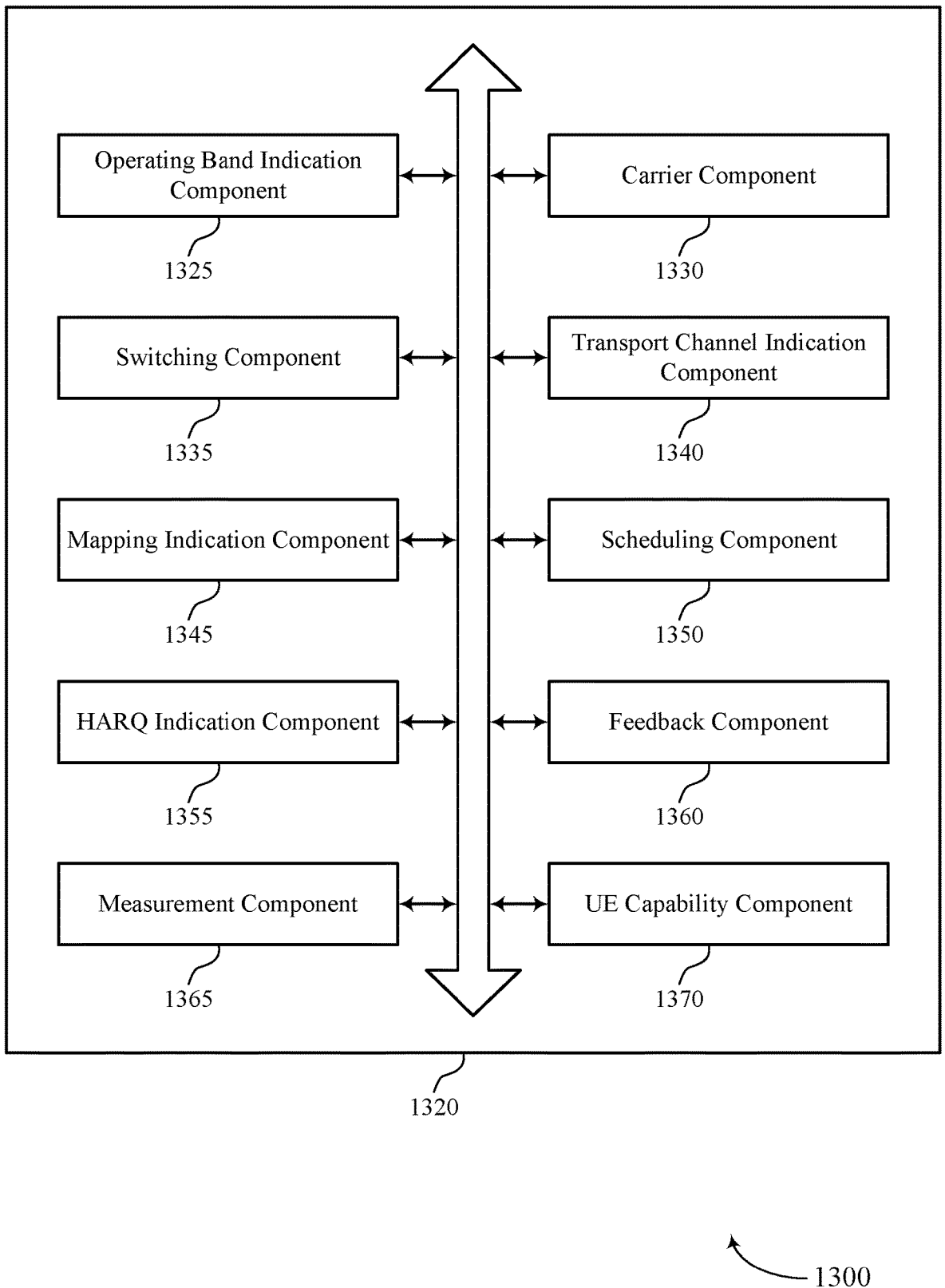
FIG. 13 shows a block diagram of a communications manager that supports flexible channel structure for paired radio frequency spectrum bands in accordance with one or more aspects of the present disclosure.

FIG. 13 shows a block diagram 1300 of a communications manager 1320 that supports flexible channel structure for paired radio frequency spectrum bands in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of flexible channel structure for paired radio frequency spectrum bands as described herein. For example, the communications manager 1320 may include an operating band indication component 1325, a carrier component 1330, a switching component 1335, a transport channel indication component 1340, a mapping indication component 1345, a scheduling component 1350, an HARQ indication component 1355, a feedback component 1360, a measurement component 1365, a UE capability component 1370, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The operating band indication component 1325 may be configured as or otherwise support a means for transmitting control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration. The carrier component 1330 may be configured as or otherwise support a means for communicating concurrently a plurality of messages with the wireless device using the first carrier and the second carrier.

In some examples, to support transmitting the control signaling, the operating band indication component 1325 may be configured as or otherwise support a means for transmitting a first indication of the first carrier paired with the second carrier in the first operating band and a second indication of the second carrier identifying that the second carrier is unpaired, wherein the second carrier is used for both transmissions from the wireless device and receptions at the wireless device based at least in part on the first indication and the second indication.

In some examples, to support transmitting the control signaling, the operating band indication component 1325 may be configured as or otherwise support a means for transmitting a second indication that the first carrier is to be used for frequency division duplexing or for supplemental downlink at the wireless device and the second carrier is to be used for time division duplexing at the wireless device, wherein the first carrier is used for transmissions from the wireless device or receptions at the wireless device and the second carrier is used for transmissions from the wireless device and receptions at the wireless device based at least in part on the second indication.

In some examples, the switching component 1335 may be configured as or otherwise support a means for transmitting second control signaling that includes a second indication for the wireless device to switch from one of transmitting from the wireless device or receiving at the wireless device using the first carrier for a first set of time intervals to a different one of transmitting from the wireless device or receiving at the wireless device using the second carrier for a second set of time intervals.

In some examples, the transport channel indication component 1340 may be configured as or otherwise support a means for transmitting second control signaling that includes a second indication identifying at least one respective transport channel for the first carrier and the second carrier, wherein communicating the plurality of messages is based at least in part on the second indication.

In some examples, the second indication includes an indication for the wireless device to switch from using a first BWP corresponding to the one of transmitting from the wireless device or receiving at the wireless device using the first carrier to using a second BWP corresponding to a different one of transmitting from the wireless device or receiving at the wireless device using the second carrier.

In some examples, the mapping indication component 1345 may be configured as or otherwise support a means for transmitting second control signaling that identifies a mapping between a channel and two or more of downlink, uplink, or sidelink, wherein the channel comprises a quality of service flow, a radio bearer, a radio link control channel or bearer, logical channel, wherein communicating the plurality of messages is based at least in part on the mapping.

In some examples, the scheduling component 1350 may be configured as or otherwise support a means for transmitting second control signaling that includes a second indication scheduling a first message to be communicated using a first one or more resources from a resource pool and a second message to be communicated using a second one or more resources from the resource pool, wherein the first one or more resources are associated with the first carrier and the second one or more resources are associated with the second carrier, and wherein communicating the plurality of messages is based at least in part on the second indication.

In some examples, the scheduling component 1350 may be configured as or otherwise support a means for transmitting first scheduling information for a first message of the plurality of messages to be communicated using the first carrier and second scheduling information for a second message of the plurality of messages to be communicated using the second carrier, the first carrier and the second carrier being separately scheduled.

In some examples, the HARQ indication component 1355 may be configured as or otherwise support a means for transmitting second control signaling that includes a second indication of a first quantity of hybrid automatic repeat request processes associated with the first carrier and a second quantity of hybrid automatic repeat request processes associated with the second carrier.

In some examples, the first carrier and the second carrier are used at least for transmissions from the wireless device, and the feedback component 1360 may be configured as or otherwise support a means for transmitting second control signaling that includes a second indication for the wireless device to use the first carrier, the second carrier, or both, for transmitting feedback associated with communicating the plurality of messages.

In some examples, the second control signaling further includes a third indication of a first timing advance value to be used at the wireless device for the first carrier and a second timing advance value to be used at the wireless device for the second carrier.

In some examples, the measurement component 1365 may be configured as or otherwise support a means for transmitting second control signaling that includes a second indication for the wireless device to use the first carrier, the second carrier, or both, for performing received power measurements for channel state information reporting.

In some examples, the wireless device includes a UE, and the UE capability component 1370 may be configured as or otherwise support a means for receiving second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

Figure 14:
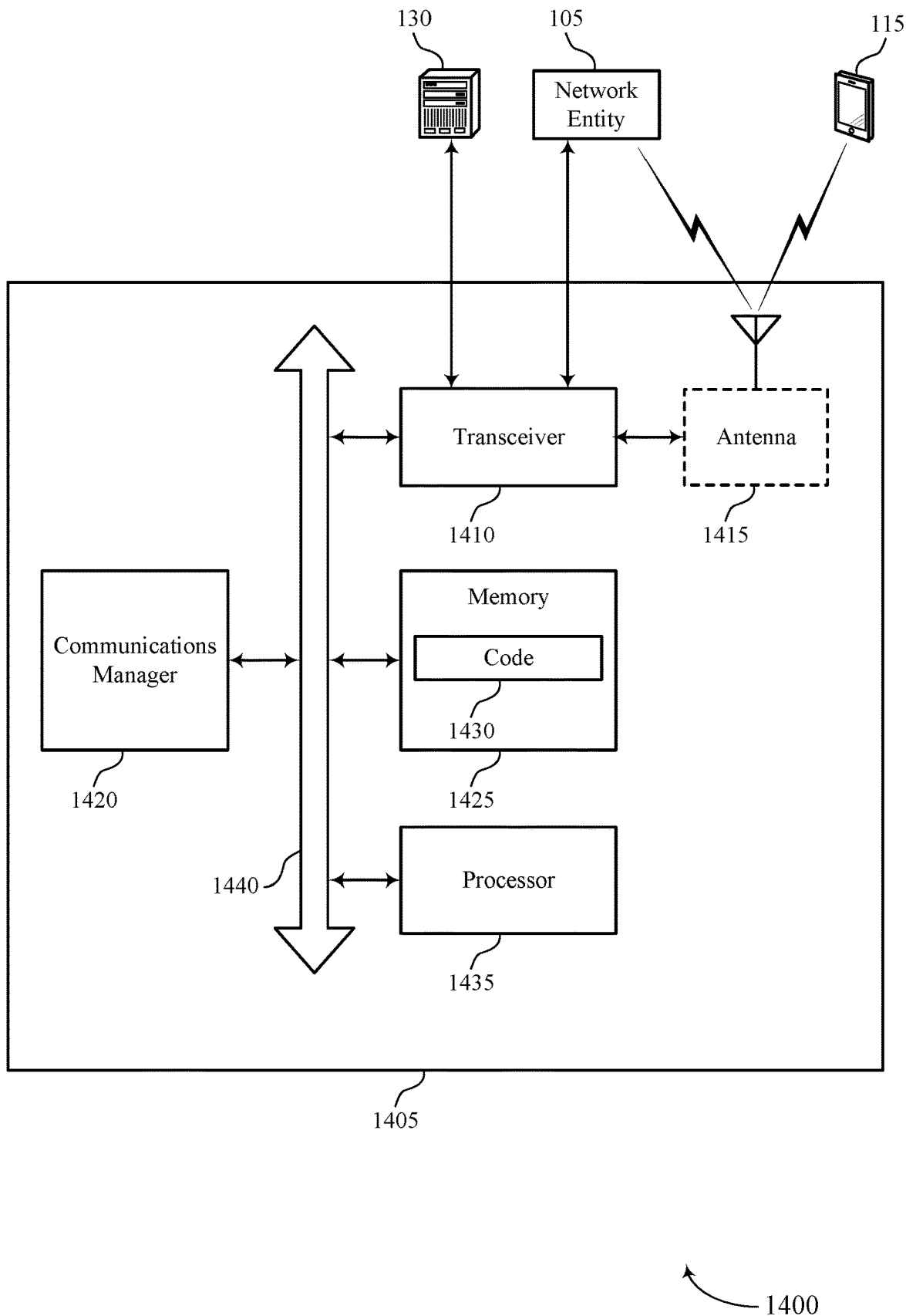
FIG. 14 shows a diagram of a system including a device that supports flexible channel structure for paired radio frequency spectrum bands in accordance with one or more aspects of the present disclosure.

FIG. 14 shows a diagram of a system 1400 including a device 1405 that supports flexible channel structure for paired radio frequency spectrum bands in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting flexible channel structure for paired radio frequency spectrum bands). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration. The communications manager 1420 may be configured as or otherwise support a means for communicating concurrently a plurality of messages with the wireless device using the first carrier and the second carrier.

By including or configuring the communications manager 1420 in accordance with examples as described herein, the device 1405 may support techniques for improved communication reliability, reduced latency, and more efficient utilization of communication resources.

In some examples, the communications manager 1420 may be configured to perform various operations (e.g., receiving, obtaining, monitoring, outputting, transmitting)

using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of flexible channel structure for paired radio frequency spectrum bands as described herein, or the processor 1435 and the memory 1425 may be otherwise configured to perform or support such operations.

Figure 15:
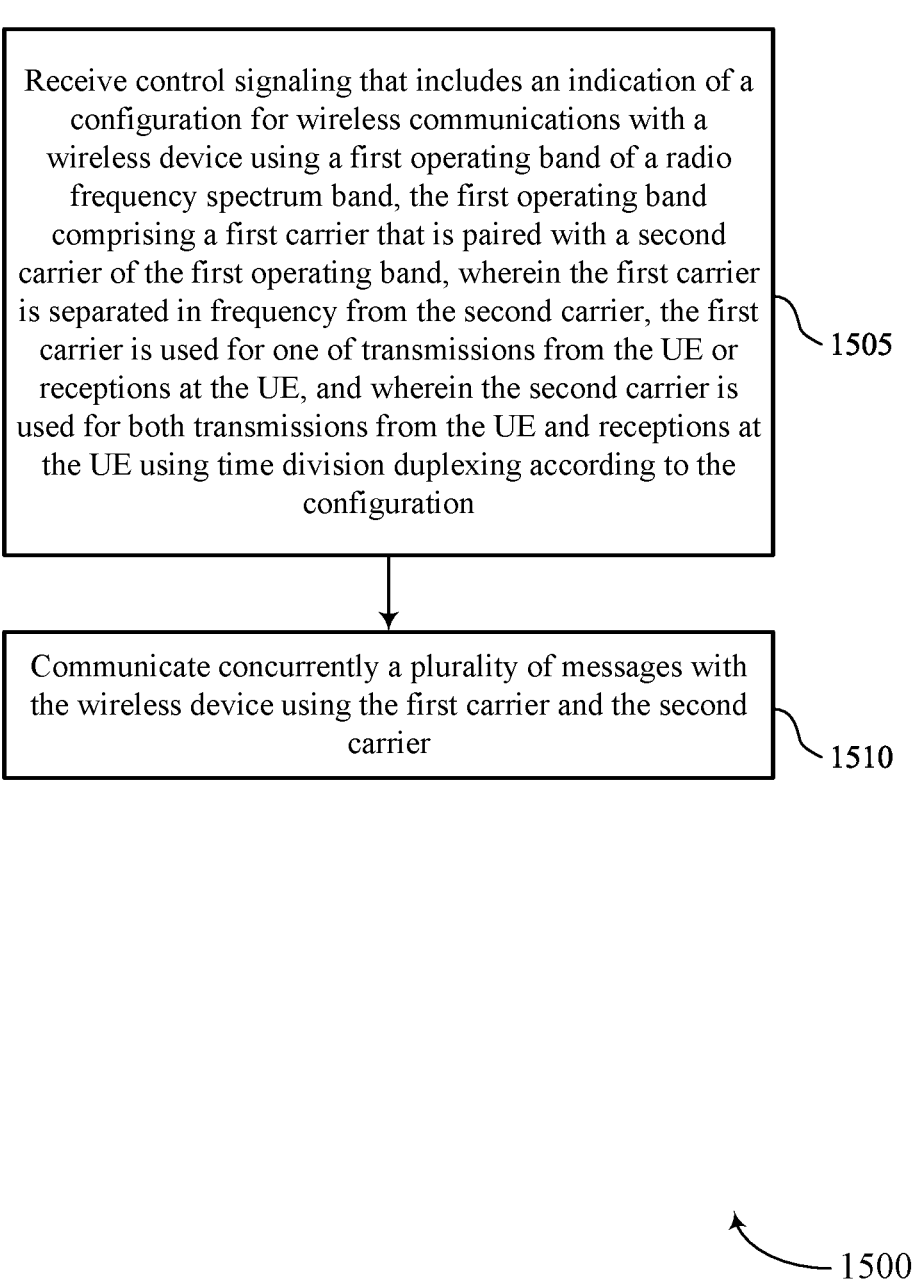

FIG. 15 shows a flowchart illustrating a method 1500 that supports flexible channel structure for paired radio frequency spectrum bands in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration. The operations of 1505 may be performed in accordance with examples as disclosed herein. In some examples, aspects of the operations of 1505 may be performed by a carrier indication component 925 as described with reference to FIG. 9.

At 1510, the method may include communicating concurrently a plurality of messages with the wireless device using the first carrier and the second carrier. The operations of 1510 may be performed in accordance with examples as disclosed herein. In some examples, aspects of the operations of 1510 may be performed by a message component 930 as described with reference to FIG. 9.

Figure 16:
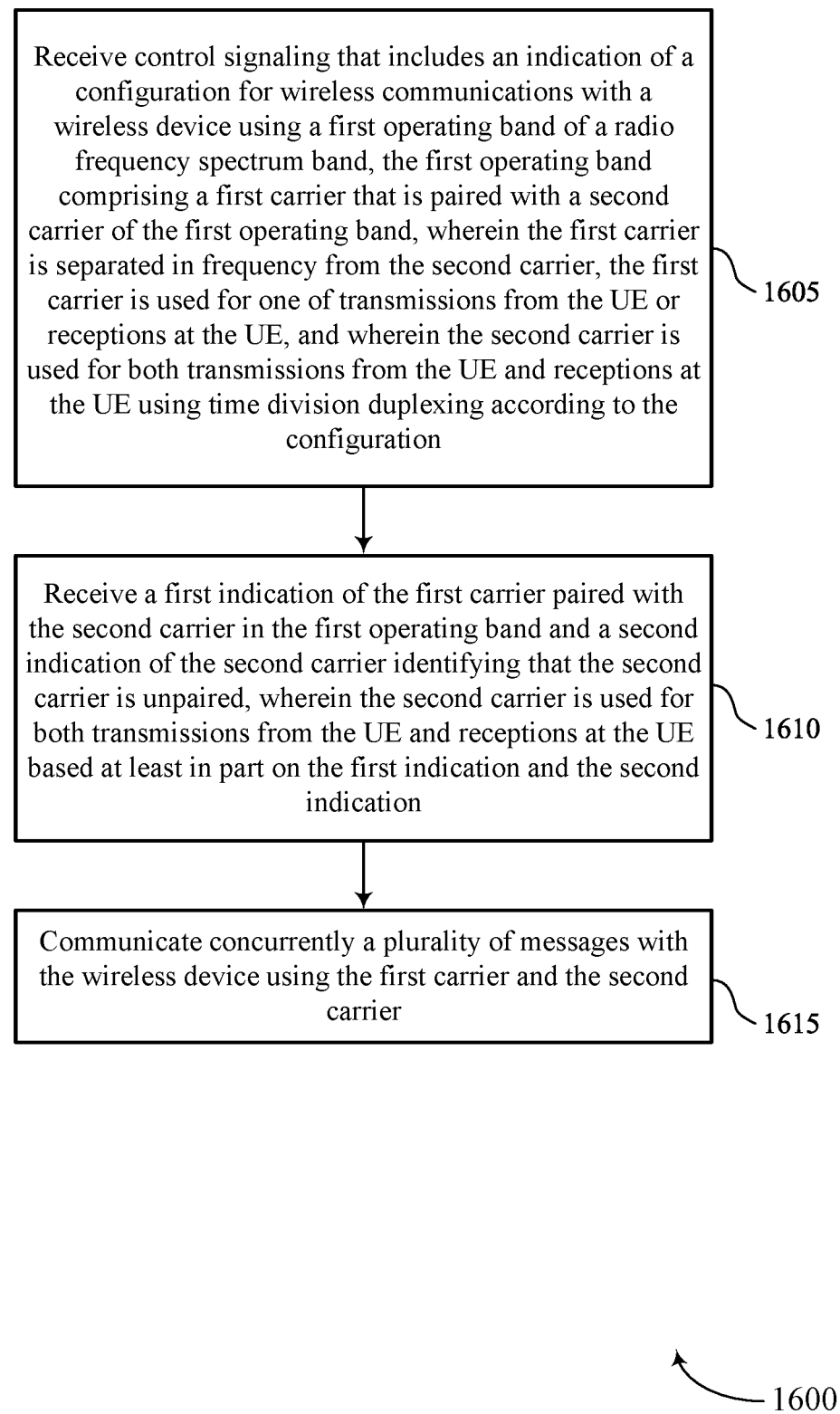

FIG. 16 shows a flowchart illustrating a method 1600 that supports flexible channel structure for paired radio frequency spectrum bands in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration. The operations of 1605 may be performed in accordance with examples as disclosed herein. In some examples, aspects of the operations of 1605 may be performed by a carrier indication component 925 as described with reference to FIG. 9.

At 1610, the method may include receiving a first indication of the first carrier paired with the second carrier in the first operating band and a second indication of the second carrier identifying that the second carrier is unpaired, wherein the second carrier is used for both transmissions from the UE and receptions at the UE based at least in part on the first indication and the second indication. The operations of 1610 may be performed in accordance with examples as disclosed herein. In some examples, aspects of the operations of 1610 may be performed by a carrier indication component 925 as described with reference to FIG. 9.

At 1615, the method may include communicating concurrently a plurality of messages with the wireless device using the first carrier and the second carrier. The operations of 1615 may be performed in accordance with examples as disclosed herein. In some examples, aspects of the operations of 1615 may be performed by a message component 930 as described with reference to FIG. 9.

Figure 17:
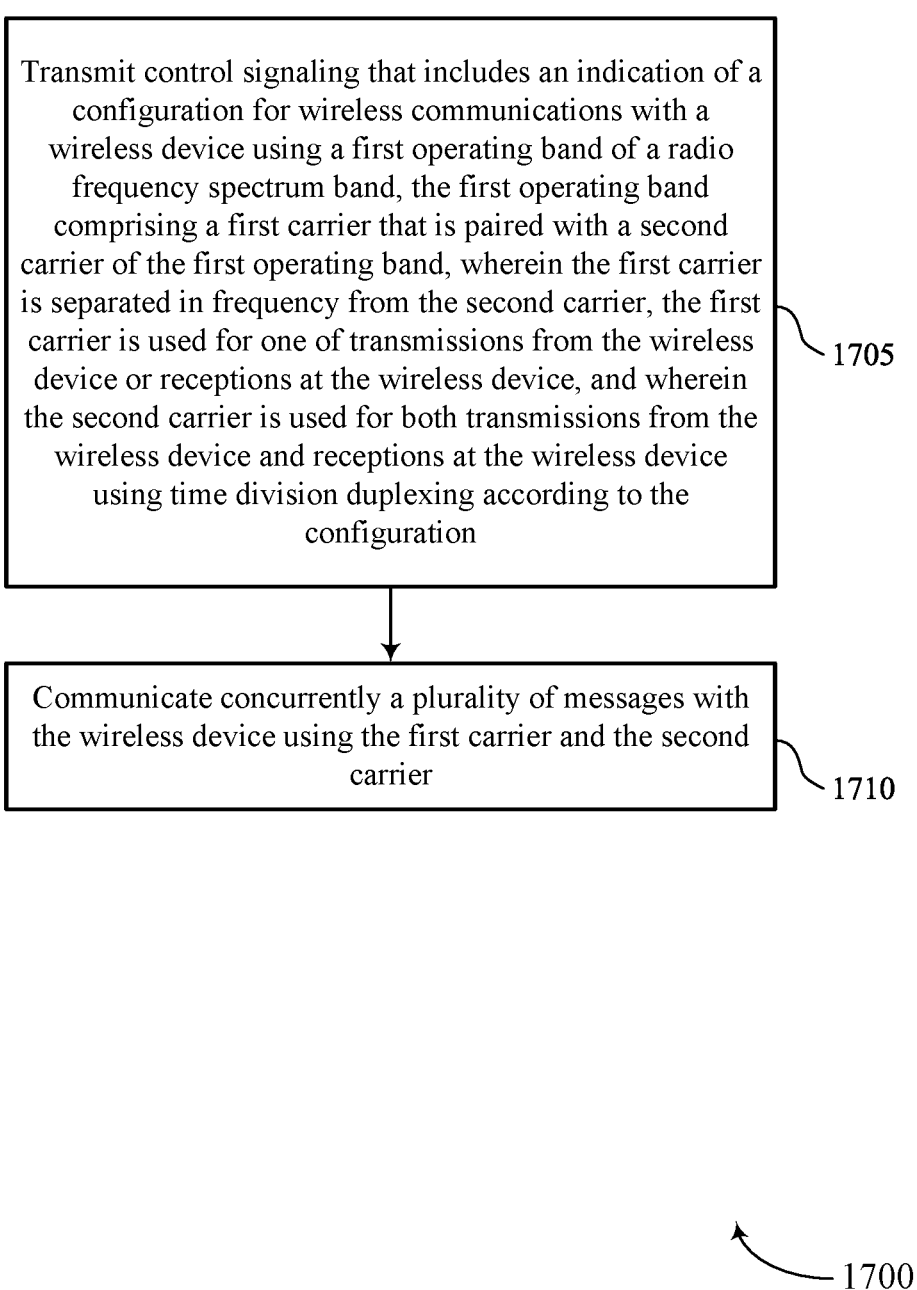

FIG. 17 shows a flowchart illustrating a method 1700 that supports flexible channel structure for paired radio frequency spectrum bands in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration. The operations of 1705 may be performed in accordance with examples as disclosed herein. In some examples, aspects of the operations of 1705 may be performed by an operating band indication component 1325 as described with reference to FIG. 13.

At 1710, the method may include communicating concurrently a plurality of messages with the wireless device using the first carrier and the second carrier. The operations of 1710 may be performed in accordance with examples as disclosed herein. In some examples, aspects of the operations of 1710 may be performed by a carrier component 1330 as described with reference to FIG. 13.

FIG. 18 shows a flowchart illustrating a method 1800 that supports flexible channel structure for paired radio frequency spectrum bands in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration. The operations of 1805 may be performed in accordance with examples as disclosed herein. In some examples, aspects of the operations of 1805 may be performed by an operating band indication component 1325 as described with reference to FIG. 13.

At 1810, the method may include transmitting second control signaling that includes a second indication for the wireless device to switch from one of transmitting from the wireless device or receiving at the wireless device using the first carrier for a first set of time intervals to a different one of transmitting from the wireless device or receiving at the wireless device using the second carrier for a second set of time intervals. The operations of 1810 may be performed in accordance with examples as disclosed herein. In some examples, aspects of the operations of 1810 may be performed by a switching component 1335 as described with reference to FIG. 13.

At 1815, the method may include communicating concurrently a plurality of messages with the wireless device using the first carrier and the second carrier. The operations of 1815 may be performed in accordance with examples as disclosed herein. In some examples, aspects of the operations of 1815 may be performed by a carrier component 1330 as described with reference to FIG. 13.

The following provides an overview of aspects of the present disclosure:

Aspect 1: A method for wireless communication at a UE, comprising: receiving control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the UE or receptions at the UE, and wherein the second carrier is used for both transmissions from the UE and receptions at the UE using TDD according to the configuration; and communicating concurrently a plurality of messages with the wireless device using the first carrier and the second carrier.

Aspect 2: The method of aspect 1, wherein receiving the control signaling that includes the indication comprises: receiving a first indication of the first carrier paired with the second carrier in the first operating band and a second indication of the second carrier identifying that the second carrier is unpaired, wherein the second carrier is used for both transmissions from the UE and receptions at the UE based at least in part on the first indication and the second indication.

Aspect 3: The method of aspect 1, wherein receiving the control signaling comprises: receiving a second indication that the first carrier is to be used for FDD or for supplemental downlink at the UE and the second carrier is to be used for TDD at the UE, wherein the first carrier is used for transmissions from the UE or receptions at the UE and the second carrier is used for transmissions from the UE and receptions at the UE based at least in part on the second indication.

Aspect 4: The method of aspect 1 through 3, further comprising: receiving second control signaling that includes a second indication for the UE to switch from one of transmitting from the UE or receiving at the UE using the first carrier for a first set of time intervals to a different one of transmitting from the UE or receiving at the UE using the second carrier for a second set of time intervals.

Aspect 5: The method of aspect 4, wherein the second indication comprises an indication for the UE to switch from using a first BWP corresponding to the one of transmitting from the UE or receiving at the UE using the first carrier to using a second BWP corresponding to the different one of transmitting from the UE or receiving at the UE using the second carrier.

Aspect 6: The method of any of aspects 1 through 5, further comprising: receiving second control signaling that identifies a mapping between a channel and two or more of downlink, uplink, or sidelink, wherein the channel comprises a QoS flow, a radio bearer, a RLC channel or bearer, logical channel, wherein communicating the plurality of messages is based at least in part on the mapping.

Aspect 7: The method of any of aspects 1 through 6, further comprising: receiving second control signaling that includes a second indication scheduling a first message to be communicated using a first one or more resources from a resource pool and a second message to be communicated using a second one or more resources from the resource pool, wherein the first one or more resources are associated with the first carrier and the second one or more resources are associated with the second carrier, and wherein communicating the plurality of messages is based at least in part on the second indication.

Aspect 8: The method of any of aspects 1 through 6, further comprising: receiving first scheduling information for a first message of the plurality of messages to be communicated using the first carrier and second scheduling information for a second message of the plurality of messages to be communicated using the second carrier, the first carrier and the second carrier being separately scheduled.

Aspect 9: The method of any of aspects 1 through 8, further comprising: receiving second control signaling that includes a second indication of a first quantity of HARQ processes associated with the first carrier and a second quantity of HARQ processes associated with the second carrier.

Aspect 10: The method of any of aspects 1 through 9, wherein the first carrier and the second carrier are used at least for transmissions from the UE, the method further comprising: receiving second control signaling that includes a second indication for the UE to use the first carrier, the second carrier, or both, for transmitting feedback associated with communicating the plurality of messages.

Aspect 11: The method of any of aspects 1 through 10, further comprising: receiving second control signaling that includes a second indication identifying at least one type of signal to be transmitted from the UE or received at the UE using the first carrier during a random access procedure and at least one respective type of signal to be transmitted from the UE and received at the UE using the second carrier during the random access procedure.

Aspect 12: The method of aspect 11, wherein the second control signaling further includes a third indication of a first timing advance value to be used at the UE for the first carrier and a second timing advance value to be used at the UE for the second carrier.

Aspect 13: The method of any of aspects 1 through 12, further comprising: receiving second control signaling that includes a second indication for the UE to use the first carrier, the second carrier, or both, for performing received power measurements for channel state information reporting.

Aspect 14: The method of any of aspects 1 through 13, further comprising: transmitting second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

Aspect 15: A method for wireless communication at a network entity, comprising: transmitting control signaling that includes an indication of a configuration for wireless communications with a wireless device using a first operating band of a radio frequency spectrum band, the first operating band comprising a first carrier that is paired with a second carrier of the first operating band, wherein the first carrier is separated in frequency from the second carrier, the first carrier is used for one of transmissions from the wireless device or receptions at the wireless device, and wherein the second carrier is used for both transmissions from the wireless device and receptions at the wireless device using TDD according to the configuration; and communicating concurrently a plurality of messages with the wireless device using the first carrier and the second carrier.

Aspect 16: The method of aspect 15, wherein transmitting the control signaling comprises: transmitting a first indication of the first carrier paired with the second carrier in the first operating band and a second indication of the second carrier identifying that the second carrier is unpaired, wherein the second carrier is used for both transmissions from the wireless device and receptions at the wireless device based at least in part on the first indication and the second indication.

Aspect 17: The method of aspect 15, wherein transmitting the control signaling comprises: transmitting a second indication that the first carrier is to be used for FDD or for supplemental downlink at the wireless device and the second carrier is to be used for TDD at the wireless device, wherein the first carrier is used for transmissions from the wireless device or receptions at the wireless device and the second carrier is used for transmissions from the wireless device and receptions at the wireless device based at least in part on the second indication.

Aspect 18: The method of any of aspects 15 through 17, further comprising: transmitting second control signaling that includes a second indication for the wireless device to switch from one of transmitting from the wireless device or receiving at the wireless device using the first carrier for a first set of time intervals to a different one of transmitting from the wireless device or receiving at the wireless device using the second carrier for a second set of time intervals.

Aspect 19: The method of any of aspects 15 through 18, further comprising: transmitting second control signaling that includes a second indication identifying at least one respective transport channel for the first carrier and the second carrier, wherein communicating the plurality of messages is based at least in part on the second indication.

Aspect 20: The method of aspect 19, wherein the second indication comprises an indication for the wireless device to switch from using a first BWP corresponding to the one of transmitting from the wireless device or receiving at the wireless device using the first carrier to using a second BWP corresponding to a different one of transmitting from the wireless device or receiving at the wireless device using the second carrier.

Aspect 21: The method of any of aspects 15 through 20, further comprising: transmitting second control signaling that identifies a mapping between a channel and two or more of downlink, uplink, or sidelink, wherein the channel comprises a QoS flow, a radio bearer, a RLC channel or bearer, logical channel, wherein communicating the plurality of messages is based at least in part on the mapping.

Aspect 22: The method of any of aspects 15 through 21, further comprising: transmitting second control signaling that includes a second indication scheduling a first message to be communicated using a first one or more resources from a resource pool and a second message to be communicated using a second one or more resources from the resource pool, wherein the first one or more resources are associated with the first carrier and the second one or more resources are associated with the second carrier, and wherein communicating the plurality of messages is based at least in part on the second indication.

Aspect 23: The method of any of aspects 15 through 21, further comprising: transmitting first scheduling information for a first message of the plurality of messages to be communicated using the first carrier and second scheduling information for a second message of the plurality of messages to be communicated using the second carrier, the first carrier and the second carrier being separately scheduled.

Aspect 24: The method of any of aspects 15 through 23, further comprising: transmitting second control signaling that includes a second indication of a first quantity of HARQ processes associated with the first carrier and a second quantity of HARQ processes associated with the second carrier.

Aspect 25: The method of any of aspects 15 through 24, wherein the first carrier and the second carrier are used at least for transmissions from the wireless device, the method further comprising: transmitting second control signaling that includes a second indication for the wireless device to use the first carrier, the second carrier, or both, for transmitting feedback associated with communicating the plurality of messages.

Aspect 26: The method of aspect 25, wherein the second control signaling further includes a third indication of a first timing advance value to be used at the wireless device for the first carrier and a second timing advance value to be used at the wireless device for the second carrier.

Aspect 27: The method of any of aspects 15 through 26 further comprising: transmitting second control signaling that includes a second indication for the wireless device to use the first carrier, the second carrier, or both, for performing received power measurements for channel state information reporting.

Aspect 28: The method of any of aspects 15 through 27, wherein the wireless device comprises a UE, the method further comprising: receiving second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

Aspect 29: An apparatus for wireless communication at a UE, comprising a processor; and a memory coupled with the processor, wherein the memory comprises instructions executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a network entity, comprising a processor; and a memory coupled with the processor, wherein the memory comprises instructions executable by the processor to cause the apparatus to perform a method of any of aspects 15 through 28.

Aspect 33: An apparatus for wireless communication at a network entity, comprising at least one means for performing a method of any of aspects 15 through 28.

Aspect 34: A non-transitory computer-readable medium storing code for wireless communication at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling that includes an indication of a configuration for wireless communications with a wireless device using a portion of a radio frequency spectrum band comprising a first carrier that is paired with a second carrier, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration; and
   communicating concurrently a plurality of messages with the wireless device using the first carrier and the second carrier.

2. The method of claim 1, wherein receiving the control signaling that includes the indication comprises:
   receiving a first indication of the first carrier paired with the second carrier and a second indication of the second carrier identifying that the second carrier is unpaired, wherein the second carrier is used for both transmissions from the UE and receptions at the UE based at least in part on the first indication and the second indication.

3. The method of claim 1, wherein receiving the control signaling comprises:
   receiving a second indication that the first carrier is to be used for frequency division duplexing or for supplemental downlink at the UE and the second carrier is to be used for time division duplexing at the UE, wherein the first carrier is used for transmissions from the UE or receptions at the UE and the second carrier is used for transmissions from the UE and receptions at the UE based at least in part on the second indication.

4. The method of claim 1, further comprising:
   receiving second control signaling that includes a second indication for the UE to switch from one of transmitting from the UE or receiving at the UE using the first carrier for a first set of time intervals to a different one of transmitting from the UE or receiving at the UE using the second carrier for a second set of time intervals.

5. The method of claim 4, wherein the second indication comprises an indication for the UE to switch from using a first bandwidth part corresponding to the one of transmitting from the UE or receiving at the UE using the first carrier to using a second bandwidth part corresponding to the different one of transmitting from the UE or receiving at the UE using the second carrier.

6. The method of claim 1, further comprising:
   receiving second control signaling that identifies a mapping between a channel and two or more of downlink, uplink, or sidelink, wherein the channel comprises a quality of service flow, a radio bearer, a radio link control channel or bearer, logical channel, wherein communicating the plurality of messages is based at least in part on the mapping.

7. The method of claim 1, further comprising:
   receiving second control signaling that includes a second indication scheduling a first message to be communicated using a first one or more resources from a resource pool and a second message to be communicated using a second one or more resources from the resource pool, wherein the first one or more resources are associated with the first carrier and the second one or more resources are associated with the second carrier, and wherein communicating the plurality of messages is based at least in part on the second indication.

8. The method of claim 1, further comprising:
   receiving first scheduling information for a first message of the plurality of messages to be communicated using the first carrier and second scheduling information for a second message of the plurality of messages to be communicated using the second carrier, the first carrier and the second carrier being separately scheduled.

9. The method of claim 1, further comprising:
   receiving second control signaling that includes a second indication of a first quantity of hybrid automatic repeat request processes associated with the first carrier and a second quantity of hybrid automatic repeat request processes associated with the second carrier.

10. The method of claim 1, wherein the first carrier and the second carrier are used at least for transmissions from the UE, the method further comprising:
    receiving second control signaling that includes a second indication for the UE to use the first carrier, the second carrier, or both, for transmitting feedback associated with communicating the plurality of messages.

11. The method of claim 1, further comprising:
receiving second control signaling that includes a second indication identifying at least one type of signal to be transmitted from the UE or received at the UE using the first carrier during a random access procedure and at least one respective type of signal to be transmitted from the UE and received at the UE using the second carrier during the random access procedure.

12. The method of claim 11, wherein the second control signaling further includes a third indication of a first timing advance value to be used at the UE for the first carrier and a second timing advance value to be used at the UE for the second carrier.

13. The method of claim 1, further comprising:
receiving second control signaling that includes a second indication for the UE to use the first carrier, the second carrier, or both, for performing received power measurements for channel state information reporting.

14. The method of claim 1, further comprising:
transmitting second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

15. A method for wireless communication at a network entity, comprising:
transmitting control signaling that includes an indication of a configuration for wireless communications with a wireless device using a portion of a radio frequency spectrum band comprising a first carrier that is paired with a second carrier, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration; and
communicating concurrently a plurality of messages with the wireless device using the first carrier and the second carrier.

16. The method of claim 15, wherein transmitting the control signaling comprises:
transmitting a first indication of the first carrier paired with the second carrier and a second indication of the second carrier identifying that the second carrier is unpaired, wherein the second carrier is used for both transmissions from the wireless device and receptions at the wireless device based at least in part on the first indication and the second indication.

17. The method of claim 15, wherein transmitting the control signaling comprises:
transmitting a second indication that the first carrier is to be used for frequency division duplexing or for supplemental downlink at the wireless device and the second carrier is to be used for time division duplexing at the wireless device, wherein the first carrier is used for transmissions from the wireless device or receptions at the wireless device and the second carrier is used for transmissions from the wireless device and receptions at the wireless device based at least in part on the second indication.

18. The method of claim 15, further comprising:
transmitting second control signaling that includes a second indication for the wireless device to switch from one of transmitting from the wireless device or receiving at the wireless device using the first carrier for a first set of time intervals to a different one of transmitting from the wireless device or receiving at the wireless device using the second carrier for a second set of time intervals.

19. The method of claim 15, further comprising:
transmitting second control signaling that includes a second indication identifying at least one respective transport channel for the first carrier and the second carrier, wherein communicating the plurality of messages is based at least in part on the second indication.

20. The method of claim 19, wherein the second indication comprises an indication for the wireless device to switch from using a first bandwidth part corresponding to the one of transmitting from the wireless device or receiving at the wireless device using the first carrier to using a second bandwidth part corresponding to a different one of transmitting from the wireless device or receiving at the wireless device using the second carrier.

21. The method of claim 15, further comprising:
transmitting second control signaling that identifies a mapping between a channel and two or more of downlink, uplink, or sidelink, wherein the channel comprises a quality of service flow, a radio bearer, a radio link control channel or bearer, logical channel, wherein communicating the plurality of messages is based at least in part on the mapping.

22. The method of claim 15, further comprising:
transmitting second control signaling that includes a second indication scheduling a first message to be communicated using a first one or more resources from a resource pool and a second message to be communicated using a second one or more resources from the resource pool, wherein the first one or more resources are associated with the first carrier and the second one or more resources are associated with the second carrier, and wherein communicating the plurality of messages is based at least in part on the second indication.

23. The method of claim 15, further comprising:
transmitting first scheduling information for a first message of the plurality of messages to be communicated using the first carrier and second scheduling information for a second message of the plurality of messages to be communicated using the second carrier, the first carrier and the second carrier being separately scheduled.

24. The method of claim 15, further comprising:
transmitting second control signaling that includes a second indication of a first quantity of hybrid automatic repeat request processes associated with the first carrier and a second quantity of hybrid automatic repeat request processes associated with the second carrier.

25. The method of claim 15, wherein the first carrier and the second carrier are used at least for transmissions from the wireless device, the method further comprising:
transmitting second control signaling that includes a second indication for the wireless device to use the first carrier, the second carrier, or both, for transmitting feedback associated with communicating the plurality of messages.

26. The method of claim 25, wherein the second control signaling further includes a third indication of a first timing advance value to be used at the wireless device for the first carrier and a second timing advance value to be used at the wireless device for the second carrier.

27. The method of claim 15 further comprising:
transmitting second control signaling that includes a second indication for the wireless device to use the first carrier, the second carrier, or both, for performing received power measurements for channel state information reporting.

28. The method of claim 15, wherein the wireless device comprises a user equipment (UE), the method further comprising:
receiving second control signaling that includes a second indication of at least one capability of the UE, the at least one capability including a ratio between a capacity for transmissions from the UE and a capacity for receptions at the UE, a capability of the UE to perform full-duplex communications, a capability of the UE to perform half-duplex communications, a processing time supported at the UE, a buffer size supported at the UE, or any combination thereof.

29. An apparatus for wireless communication at a user equipment (UE), comprising:
a processor; and
a memory coupled with the processor, wherein the memory comprises instructions executable by the processor to cause the apparatus to:
receive control signaling that includes an indication of a configuration for wireless communications with a wireless device using a portion of a radio frequency spectrum band comprising a first carrier that is paired with a second carrier, wherein the first carrier is separated in frequency from the second carrier, the first carrier is used for one of transmissions from the UE or receptions at the UE, and wherein the second carrier is used for both transmissions from the UE and receptions at the UE using time division duplexing according to the configuration; and
communicate concurrently a plurality of messages with the wireless device using the first carrier and the second carrier.

30. An apparatus for wireless communication at a network entity, comprising:
a processor; and
a memory coupled with the processor, wherein the memory comprises instructions executable by the processor to cause the apparatus to:
transmit control signaling that includes an indication of a configuration for wireless communications with a wireless device using a portion of a radio frequency spectrum band comprising a first carrier that is paired with a second carrier, wherein the first carrier is separated in frequency from the second carrier, the first carrier is used for one of transmissions from the wireless device or receptions at the wireless device, and wherein the second carrier is used for both transmissions from the wireless device and receptions at the wireless device using time division duplexing according to the configuration; and
communicate concurrently a plurality of messages with the wireless device using the first carrier and the second carrier.

* * * * *